（12）United States Patent
Arazaki

(10) Patent No.: US 7,497,537 B2
(45) Date of Patent: Mar. 3, 2009

(54) PRINTING APPARATUS, PRINTING PROGRAM, PRINTING METHOD AND PRINTING DATA GENERATING APPARATUS, PRINTING DATA GENERATING PROGRAM, PRINTING DATA GENERATING METHOD, AND RECORDING MEDIUM RECORDING THE PROGRAMS

(75) Inventor: Shinichi Arazaki, Shimosuwa-machi (JP)

(73) Assignee: Seiko Epson Corporation (JP)

( * ) Notice: Subject to any disclaimer, the term of this patent is extended or adjusted under 35 U.S.C. 154(b) by 512 days.

(21) Appl. No.: 11/243,434

(22) Filed: Oct. 4, 2005

(65) Prior Publication Data

US 2006/0071955 A1 Apr. 6, 2006

(30) Foreign Application Priority Data

Oct. 5, 2004 (JP) ............................. 2004-292205
Jul. 6, 2005 (JP) ............................. 2005-197790

(51) Int. Cl.
*B41J 29/38* (2006.01)

(52) U.S. Cl. .............................. 347/14; 347/15; 347/19

(58) Field of Classification Search ............. 347/14–15, 347/43, 41
See application file for complete search history.

(56) References Cited

U.S. PATENT DOCUMENTS 6,283,571 B1 9/2001 Zhou et al.
6,293,643 B1 9/2001 Shimada et al.
6,328,404 B1 12/2001 Fujimori
6,356,358 B1* 3/2002 Kakutani et al. ............. 358/1.7
2002/0021325 A1 2/2002 Koitabashi et al.
2003/0085939 A1 5/2003 Koitabashi et al.

FOREIGN PATENT DOCUMENTS

| JP | 01-235655 | 9/1989 |
|---|---|---|
| JP | 05-092559 | 4/1993 |
| JP | 05-269990 | 10/1993 |
| JP | 11-151821 | 8/1999 |
| JP | 11-254662 | 9/1999 |
| JP | 2000-79710 | 3/2000 |
| JP | 2000-190470 | 7/2000 |
| JP | 2000-225716 | 8/2000 |
| JP | 2002-019101 | 1/2002 |
| JP | 2003-063043 | 3/2003 |
| JP | 2003-136702 | 5/2003 |

* cited by examiner

*Primary Examiner*—Thinh H Nguyen
(74) *Attorney, Agent, or Firm*—Harness, Dickey & Pierce, P.L.C.

(57) ABSTRACT

A printing apparatus which prints plural dots on a printing medium by a printing head to form a predetermined image, including: an image data acquirement unit acquiring image data corresponding to the predetermined image; a data conversion unit converting the image data, for each pixel, into printing data relating to a presence or absence of a dot; a printing head grasp unit grasping characteristic information of the printing head; and a printing unit executing printing based on the data obtained, wherein when the occurrence of a banding phenomenon is forecasted based on the characteristic information, the data conversion unit converts the image data so that the size of a part or all dots associated with the banding phenomenon is changed to a size different from the size of a dot when the occurrence of the banding phenomenon is not forecasted.

7 Claims, 12 Drawing Sheets

ERROR DIFFUSION MATRIX

| | ATTENTION GETTING PIXEL | 7/16 |
|---|---|---|
| 3/16 | 5/16 | 1/16 |

| | ATTENTION GETTING PIXEL | 44 |
|---|---|---|
| 19 | 32 | 6 |

RESULT OF ERROR DIFFUSION OF 101

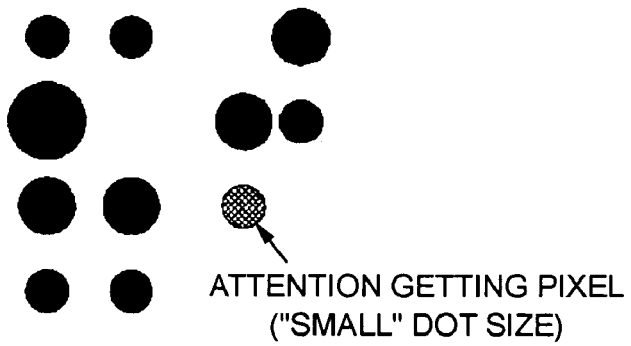
EXTRACTION OF ATTENTION GETTING DOT
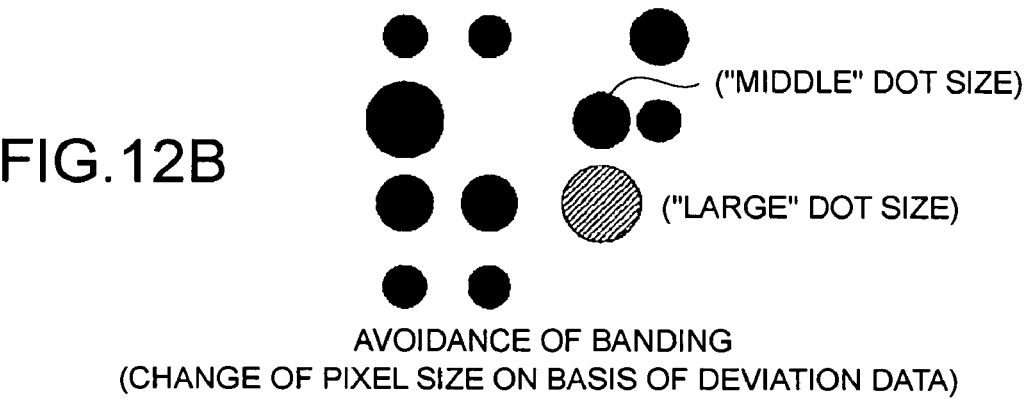
AVOIDANCE OF BANDING
(CHANGE OF PIXEL SIZE ON BASIS OF DEVIATION DATA)
CHANGE OF ATTENTION GETTING PIXEL DOT
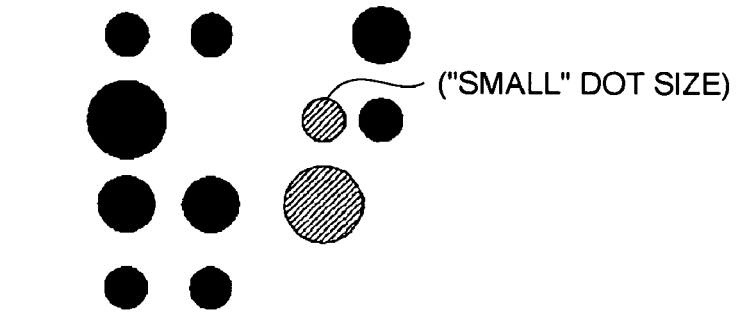
CHANGE OF BINARIZED DATA

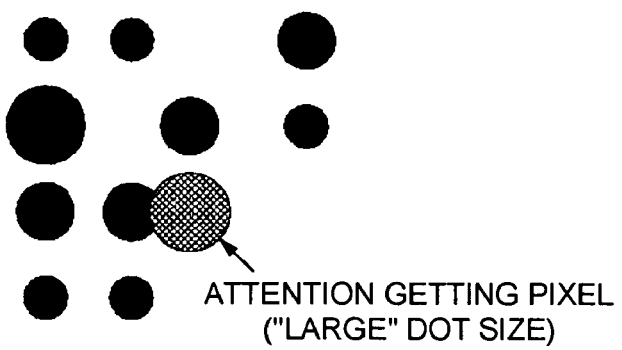
EXTRACTION OF ATTENTION GETTING DOT
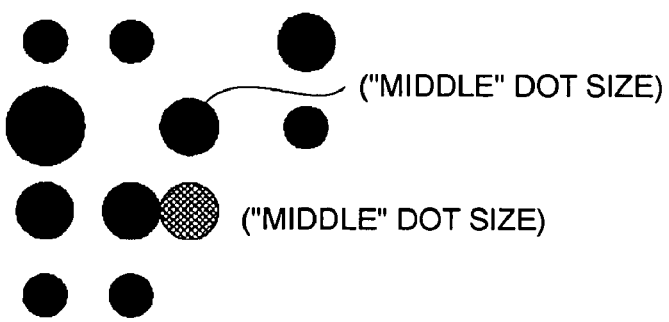
CHANGE OF ATTENTION GETTING DOT

PRINTING APPARATUS, PRINTING PROGRAM, PRINTING METHOD AND PRINTING DATA GENERATING APPARATUS, PRINTING DATA GENERATING PROGRAM, PRINTING DATA GENERATING METHOD, AND RECORDING MEDIUM RECORDING THE PROGRAMS

RELATED APPLICATIONS

This application claims priority to Japanese Patent Application Nos. 2004-292205 filed Oct. 5, 2004 and 2005-197790 filed Jul. 6, 2005 which are hereby expressly incorporated by reference herein in their entirety.

BACKGROUND OF THE INVENTION

1. Technical Field

The present invention relates to a printing apparatus of which a facsimile apparatus, a copying machine, or a printer of an Office Automation Apparatus is representative, a printing control program, and a printing control method. Particularly, the invention relates to an ink jet type printing apparatus in which particles of liquid ink of plural colors are ejected-on printing paper (recording medium) thereby to draw the predetermined character and image, a printing program, a printing method and printing data generating apparatus, a printing data generating program, a printing data generating method, and a recording medium storing the programs.

2. Related Art

Generally, ink jet type printing apparatuses (hereinafter referred to as an "ink jet printer") can readily obtain a high quality color printing at a low cost. Therefore, with the spread of personal computers and digital cameras, this type of printing apparatus has been widely applied not only in offices but also by general users.

In such an ink jet printer, generally, while a moving member referred to as a carriage which integrally includes an ink cartridge and a printing head reciprocates on a printing medium (paper) in a direction vertical to the paper feeding direction, a particle of liquid ink is ejected in the shape of a dot from a nozzle of the printing head, whereby the predetermined character and image are drawn on the printing paper and the desired printing is created. Since this carriage includes ink cartridges of four colors including black (black, yellow, magenta, and cyan) and a printing head for each color, not only monochromatic printing but also full color printing having combinations of each color can be readily performed. Further, an ink jet printer including ink cartridges of six, seven, or eight colors in which light cyan, light magenta, and the like are added to the above four colors has been put to a practical use.

Further, in the ink jet printer of such a type which executes printing while thus reciprocating the printing head on the carriage in the direction vertical to the paper feeding direction, it is necessary to reciprocate the printing head from several times to one hundred times or more to finely print the entire page,. Therefore, this type of ink jet printer has a deficiency in that it takes a long printing time, compared with another type printing apparatus, for example, a laser printer using electrophotography of a copying machine. This type of ink jet printer is generally referred to as a "multipass type printer".

In contrast, in an ink jet printer which has a long printing head and does not use a carriage, printing in which the printing head is moved in the width direction of printing paper by one scanning (one pass) is possible. Therefore, high speed printing similar to that in a laser printer can be performed. Further, since a carriage which mounts a printing head and a drive system for moving the carriage are not required, the size and weight of a printer housing can be reduced. Further, this ink jet printer also has an advantage in that noise reduction improves greatly. This type of ink jet printer is generally referred to as a "line head type printer".

The printing head essential to such an ink jet printer has minute nozzles with a diameter of about 10 to 70 μm. The nozzles are spaced in a row or in plural rows in the printing direction. Therefore, due to unevenness during manufacturing, the ink ejecting direction of a partial nozzle tilts, or the nozzle is arranged out of an ideal position, so that a dot formed by that nozzle can be off a target point (ideal impact position). A so-called "splash bending phenomenon" can be produced.

As a result, in the printing portion corresponding to that bad nozzle part, bad printing referred to as a so-called "banding (streak) phenomenon" is produced, and printing quality can be greatly reduced. Namely, in case that the "splash bending phenomenon" is produced, the distance between the adjacent dots becomes uneven. In a portion where the distance between the adjacent dots is long, a "white streak (in case of white printing paper)" is produced; and in a portion where the distance between the adjacent dots is short, a "dark streak" is produced.

Particularly, such a banding phenomenon is easier to be remarkably produced in the "line head type printer" in which the printing head is fixed (one pass printing is performed) than in the "multipass type printer." In the multipass type printer, the white streak is made inconspicuous by reciprocating the printing head many times.

Therefore, in order to prevent bad printing by such a "banding phenomenon", improvement in manufacturing the printing head or improvement of its design, that is, research and development in hardware has been eagerly performed. However, it is difficult, due to manufacturing cost, printing quality, and current technology, to provide a printing head in which the "banding phenomenon" is eliminated.

Therefore, at present, in addition to the improvement in the hardware, a software method such as the printing control described below is used, whereby such a "banding phenomenon" is reduced.

For example, in JP-A-2002-19101 and JP-A-2003-136702, in order to meet the unevenness of the nozzle and the non-ejection of ink, in a portion which is low in density, shading correction is used to meet the unevenness of the head, and in a portion which is high in density, another color is substitutively used thereby to make banding and unevenness inconspicuous.

Further, in JP-A-2003-63043, regarding a solid image, that is, an image to be formed by shooting ink on the entire paper so that a white surface of the printing paper is invisible, a method of increasing the ink ejection amount from a nozzle adjacent to the pixels neighboring the non-ejection nozzle to form the solid image by all the nozzles is adopted.

However, in the method of reducing the banding phenomenon and the unevenness by using another color like the former related art, the hue of the portion subjected to the processing changes. Therefore, this method is not suitable for printing color photographic images or the like where a high quality image is required.

Further, in the portion which is high in density, the method of avoiding the "white streak phenomenon" by distributing the information of the non-ejection nozzle to the left and right, in case that this is applied to the "splash bending phenomenon", is effective. However, there is a problem that banding remains in the portion-which is high in density.

On the other hand, a method like the latter related art has no problem when printing a solid image. However, when printing a halftone image, this method cannot be used. Further, when the method of filling a fine line with another color is used a little, there is no problem. However, in an image in which other colors continuously appear, similarly to the former method, there remains a problem that, the hue of a part of the image changes.

SUMMARY

An advantage of the invention is to provide a new printing apparatus, printing program, printing method and printing data generating apparatus, printing data generating program, printing data generating method, and recording medium recording the programs, in which the banding phenomenon caused particularly by the splash bending phenomenon can be removed or made nearly inconspicuous.

First Aspect

According to a first aspect of the invention, a printing apparatus which prints plural dots on a printing medium by a printing head thereby to form a predetermined image, comprises: an image data acquirement unit which acquires image data corresponding to the predetermined image; a data conversion unit which converts the image data acquired by the image data acquirement unit, for each pixel of the image data, into printing data relating to at least either of a presence and an absence of a dot; a printing head grasp unit which grasps characteristic information of the printing head; and a printing unit which executes printing based on the data obtained by the data-conversion unit. Herein, the data conversion unit, when the occurrence of a banding phenomenon is forecasted based on the characteristic information of the printing head grasped by the printing head grasp unit, converts the image data so that the size of a part or all dots associated with the banding phenomenon is changed to the size different from the size of a dot when the occurrence of the banding phenomenon is not forecasted.

Hereby, the banding phenomenon caused by a so-called splash bending phenomenon can be removed or made nearly inconspicuous.

Here, the "banding phenomenon" in this aspect means bad printing in which one or both of a "white streak" and a "dark streak", occur (This phenomenon has the same meaning also in the following descriptions of an aspect relating to a "printing apparatus", an aspect relating to a "printing program", an aspect relating to a "printing method", an aspect relating to a "printing data generating apparatus", an aspect relating to a "printing data generating program", an aspect relating to a "printing data generating method", and an aspect relating to a "recording medium recording the programs", and in description of the embodiments.).

Further, this "splash bending phenomenon" is different from a mere non-ejection phenomenon of a partial nozzle described above. This means a phenomenon in which an ink ejecting direction from a partial nozzle tilts though ink is ejected from that nozzle, whereby a dot is formed off a target position. (This phenomenon has the same meaning also in the following descriptions of an aspect relating to a "printing apparatus", an aspect relating to a "printing program", an aspect relating to a "printing method", an aspect relating to a "printing data generating apparatus", an aspect relating to a "printing data generating program", an aspect relating to a "printing data generating method", and an aspect relating to a "recording medium recording the programs"., and in description of the embodiments.)

Further, this "white streak" means a part (area) in which a base color of a printing medium is conspicuous in the shape of a streak because a phenomenon in which the distance between the adjacent dots becomes wider than the predetermined distance by the "splash bending phenomenon" occurs continuously. Further, the "dark streak" means a part (area) in which because a phenomenon in which the distance between the adjacent dots becomes shorter than the predetermined distance by the "splash bending phenomenon" occurs continuously, a base color of a printing medium is invisible, the image is relatively darkly visible because of the short distance between the dots, or a part of a dot formed with deviation overlaps with a dot formed normally and its overlapped part is conspicuous in the shape of a dark streak (This phenomenon has the same meaning also in the following descriptions of an aspect relating to a "printing apparatus", an aspect relating to a "printing program", an aspect relating to a "printing method", an aspect relating to a "printing data generating apparatus", an aspect relating to a "printing data generating program", an aspect relating to a "printing data generating method", and an aspect-relating to a "recording medium recording the programs", and in description of the embodiments.).

Further, the "dot associated with the banding phenomenon" includes, in case of the "white streak", not only a dot of which a forming position is shifted by the "splash bending phenomenon" but also a normal dot which is longer in distance to the dot of which the forming position is shifted than the distance in a usual case. Further, the "dot associated with the banding phenomenon" includes, in case of the "dark streak", not only a dot of which a forming position is similarly shifted by the "splash bending phenomenon" but also a normal dot which is shorter in distance to the dot of which the forming position is shifted than the distance in a usual case, or a normal dot which overlaps with that dot in part or in all. (This meaning is the same also in the following descriptions of an aspect relating to a "printing apparatus", an aspect relating to a "printing program", an aspect relating to a "printing method", an aspect relating to a "printing data generating apparatus", an aspect relating to a "printing data generating program", an aspect relating to a "printing data generating method", and an aspect relating to a "recording medium recording the programs", and in description of the embodiments.)

"Grasp" by the printing head grasp unit includes an action of reading out characteristic information of the printing head from a memory unit in which the characteristic information of the printing head was previously stored in shipping, and an action of reading out characteristic information of the printing head from a memory unit in which a printing result using the printing head, which is read by a sensor, is stored. (This meaning is the same also in the following descriptions of an aspect relating to a "printing apparatus", an aspect relating to a "printing program", an aspect relating to a "printing method", an aspect relating to a "printing data generating apparatus", an aspect relating to a "printing data generating program", an aspect relating to a "printing data generating method", and an aspect relating to a "recording medium recording the programs", and in description of the embodiments.)

Second Aspect

According to a second aspect of the invention, a printing apparatus which prints plural dots on a printing medium by a printing head thereby to form a predetermined image, comprises: an image data acquirement unit which acquires image data corresponding to the predetermined image; a data conversion unit which converts the image data acquired by the image data acquirement unit, for each pixel of the image data, into printing data relating to at least either of a presence and an absence of a dot; a printing head grasp unit which grasps characteristic information of the printing head; and a printing unit which executes printing based on the data obtained by the data conversion unit. Herein, the data conversion unit, when there is a point in which the splash bending amount obtained based on the characteristic information of the printing head grasped by the printing head grasp unit is larger than a predetermined threshold, converts the image data so that the size of a part or all dots associated with the splash bending phenomenon is changed to the size different from the size of a dot when the splash bending amount is smaller than the predetermined threshold.

Hereby, similarly to the case in the first aspect, the banding phenomenon caused by the so-called splash bending phenomenon can be removed or made nearly inconspicuous.

Third Aspect

According to a third aspect of the invention, a printing apparatus which prints plural dots on a printing medium by a printing head thereby to form a predetermined image, comprises: an image data acquirement unit which acquires image data corresponding to the predetermined image; a data conversion unit which converts the image data acquired by the image data acquirement unit, for each pixel of the image data, into printing data relating to at least either of a presence and an absence of a dot; a printing head grasp unit which grasps characteristic information of the printing head; and a printing unit which executes printing based on the data obtained by the data conversion unit. Herein, the data conversion unit, when the occurrence of a banding phenomenon is forecasted based on the characteristic information of the printing head grasped by the printing head grasp unit, converts the image data so that the size of a part or all dots associated with the banding phenomenon is larger than the size of a dot when the occurrence of the banding phenomenon is not forecasted.

Hereby, the banding phenomenon caused by the so-called splash bending phenomenon can be removed or made nearly inconspicuous. Namely, like an aspect which will be described later, by making the size of the dot near the "white streak" larger than the size of the normal dot (dot size when the occurrence of the banding phenomenon is not forecasted), the "white streak" can be removed or made nearly inconspicuous.

Fourth Aspect

Further, according to a fourth aspect of the invention, in the printing apparatus according to the third aspect, the data conversion unit converts the image data so that regarding a part of dots associated with the banding phenomenon, the large converted dots do not continue adjacently.

Namely, in order to make the "white streak" by the splash bending phenomenon inconspicuous, in case that the large dot which is larger in size than the usual dot is used as the dot associated with its "white streak", if the large-sized dots are adjacently formed continuously, the "white streak" can be removed or made nearly inconspicuous. However, the density at that portion becomes too high, so that there is a possibility that on the contrary, the high density portion is conspicuous. Therefore, the sizes of the dots associated with the banding phenomenon are made large so that the large dots do not continue adjacently. Hereby, the "white streak" can be surely removed, and simultaneously the disadvantage that the density at that portion becomes so high that on the contrary, the high density portion is conspicuous can also be avoided.

Fifth Aspect

Further, according to a fifth aspect of the invention, in the printing apparatus according to the third aspect, the data conversion unit converts, when it makes large the size of the partial dot associated with the banding phenomenon, the image data so that a dot near the dot changed large is not printed.

Namely, in this aspect, the sizes of the dots associated with the banding phenomenon are changed in combination of a large dot and a small dot so that the small dot is located near the large dot. Hereby, the area tone at the correction part can be kept nearly the same as that at the normal part (part in which the banding phenomenon is not produced). As a result, not only the "white streak" and the "dark streak" caused by the banding phenomenon can be removed or made nearly inconspicuous, but also the area tone at the correction part is not different greatly from that at the other part. Therefore, traces of the processing can be surely removed.

Sixth Aspect

According to a sixth aspect of the invention, a printing apparatus which prints plural dots on a printing medium by a printing head thereby to form a predetermined image, comprises: an image data acquirement unit which acquires image data corresponding to the predetermined image; a data conversion unit which converts the image data acquired by the image data acquirement unit, for each pixel of the image data, into printing data relating to at least either of a presence and an absence of a dot; a printing head grasp unit which grasps characteristic information of the printing head; and a printing unit which executes printing based on the data obtained by the data conversion unit. Herein, the data conversion unit, when the occurrence of a banding phenomenon is forecasted based on the characteristic information of the printing head grasped by the printing head grasp unit, converts the image data so that the size of a part or all dots associated with the banding phenomenon is smaller than the size of a dot when the occurrence of the banding phenomenon is not forecasted.

Hereby, the banding phenomenon caused by the so-called splash bending phenomenon can be removed or made nearly inconspicuous. Namely, like an aspect which will be described later, by making the size of the dot near the "dark streak" smaller than the size of the normal dot (dot size when the occurrence of the banding phenomenon is not forecasted), the "dark streak" can be removed or made nearly inconspicuous.

Seventh Aspect

Further, according to a seventh aspect of the invention, in the printing apparatus according to the sixth aspect, the data conversion unit converts the image data so that regarding a part of dots associated with the banding phenomenon, the small converted dots do not continue adjacently.

Namely, in order to make the "dark streak" by the splash bending phenomenon inconspicuous, in case that the small dot which is smaller in size than the usual dot is used as the dot associated with its "dark streak", if the small-sized dots are adjacently formed continuously; the "dark streak" can be removed or made nearly inconspicuous. However, the density at that portion becomes too low, so that there is a possibility that on the contrary, the low density portion is conspicuous. Therefore, the sizes of the dots associated with the banding phenomenon are made small so that the small dots do not continue adjacently. Hereby, the "dark streak" can be surely removed, and simultaneously the disadvantage that the density at that portion becomes so low that on the contrary, the low density portion is conspicuous can also be avoided.

Eighth Aspect

Further, according to an eighth aspect of the invention, in the printing apparatus according to any of the first to seventh aspects, the data conversion unit, when changing the size of the dot associated with the banding phenomenon, diffuses the error between the dot size when the size is not changed and the dot size after change into a dot which has not been processed yet, and converts, based on the value after diffusion, the size of the dot.

Namely, in this aspect, the error for each dot which is produced when the dot size is changed from the normal size in order to remove the "white streak" or the "dark streak" caused by the banding phenomenon as in the first to seventh aspects, is diffused into the surrounding dots. Hereby, not only the area tone at the correction part can be made the same as that at the other part, but also the boundary between the correction part and the other part becomes inconspicuous, so that a more natural image can be obtained.

Therefore, in this aspect, the known error diffusion method used when a binarized image is obtained from a multi-tone image is applied. By including this error diffusion method into a series of image processing executed in printing, adjustment of the area tone at the correction part can be readily and automatically performed.

Ninth Aspect

Further, according to a ninth aspect of the invention, in the printing apparatus according to any of the first to eighth aspects, the printing head has a printing mechanism for the dot arranged in the width direction of the printing medium, and executes printing by one scanning.

Hereby, as described-before, the "white streak" and the "dark streak" caused by the banding phenomenon which is particularly easy to be produced in case that a line head type printing head in which printing ends by one pass is used can be removed or made nearly inconspicuous.

Here, "printing by one scan" means the followings: one line in the paper feeding direction (in the head moving direction) which is an object of printing by each nozzle is printed by only the nozzles that are in charge of that line, and when the nozzles that are in charge of that line pass once, printing of that line is completed (This meaning is the same also in the following descriptions of an aspect relating to a "printing apparatus", an aspect relating to a "printing program", an aspect relating to a "printing method", an aspect relating to a "printing data generating apparatus", an aspect relating to a "printing data generating program", an aspect relating to a "printing data generating method", and an aspect relating to a "recording medium recording the programs", and in description of the embodiments.).

Tenth Aspect

Further, according to a tenth aspect of the invention, in the printing apparatus according to any of the first to eighth aspects, the printing head executes printing while reciprocating in the width direction of the recording medium.

Though the above-mentioned banding phenomenon remarkably occurs in case of the line head type printing head, it occurs also in case of a multipass type printing head. Therefore, in case that the printing apparatus according to any of the first to eighth aspects is applied to the case using the multipass type printing head, the "white streak" and the "dark streak" caused by the banding phenomenon produced in the multipass type printing head can also be surely removed or made nearly inconspicuous.

Further, in case of the multipass type printing head, by making such contrivance that scan of the printing head is repeated, the banding phenomenon can be prevented. However, in case that the printing apparatuses according to the first to eighth aspects are applied, it is not necessary to scan the printing head at the same place many times. Therefore, it is also possible to realize printing of higher speed.

Eleventh Aspect

Next, according to an eleventh aspect of the invention, a printing program is used in a printing apparatus that prints plural dots on a printing medium by a printing head thereby to form a predetermined image, wherein a computer is caused to function as an image data acquirement unit which acquires image data corresponding to the predetermined image, a data conversion unit which converts the image data acquired by the image data acquirement unit, for each pixel of the image data, into printing data relating to at least either of a presence and an absence of a dot, a printing head grasp unit which grasps characteristic information of the printing head, and a printing unit which executes printing based on the data obtained by the data conversion unit. Further, this program causes the data conversion unit to function so as to, when the occurrence of a banding phenomenon is forecasted based on the characteristic information of the printing head grasped by the printing head grasp unit, convert the image data so that the size of a part or all dots associated with the banding phenomenon is changed from the size of a dot when the occurrence of the banding phenomenon is not forecasted.

Hereby, similarly to the case in the first aspect, the "white streak" and the "dark streak" can be reduced, and the banding phenomenon caused by the splash bending phenomenon can be removed or made nearly inconspicuous.

Further, the printing apparatuses which are on the market such as an ink jet printer include almost a computer system comprising a central processing unit (CPU), a memory unit (RAM, ROM), and an input and output unit. Since the afore-mentioned each unit can be realized using its computer system by software, compared with a case in which a dedicated hardware is created to realize the afore-mentioned each unit, the afore-mentioned each unit can be realized economically and readily.

Further, by rewriting a part of the program, version-up by change and improvement of function can be readily performed.

Twelfth Aspect

Further, according to a twelfth aspect of the invention, a printing program is used in a printing apparatus that prints plural dots on a printing medium by a printing head thereby to form a predetermined image, wherein a computer is caused to function as an image data acquirement unit which acquires image data corresponding to the predetermined image, a data conversion unit which converts the image data acquired by the image data acquirement unit, for each pixel of the image data, into printing data relating to at least either of a presence and an absence of a dot, a printing head grasp unit which grasps characteristic information of the printing head, and a printing unit which executes printing based on the data obtained by the data conversion unit. Further, this program causes the data conversion unit to function so as to, when there is a point in which the splash bending amount obtained based on the characteristic information of the printing head grasped by the printing head grasp unit is larger than a predetermined threshold, convert the image data so that the size of a part or all dots associated with the splash bending phenomenon is changed to the size different from the size of a dot when the splash bending amount is smaller than the predetermined threshold.

Hereby, similarly to the case in the second aspect, the banding phenomenon caused by the so-called splash bending phenomenon can be removed or made nearly inconspicuous.

Further, similarly to the case in the eleventh aspect, using a computer system included in a printing apparatus such as an ink jet printer, the before-mentioned each unit can be realized by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Thirteenth Aspect

Further, according to a thirteenth aspect of the invention, a printing program is used in a printing apparatus that prints plural dots on a printing medium by a printing head thereby to form a predetermined image, wherein a computer is caused to function as an image data acquirement unit which acquires image data corresponding to the predetermined image, a data conversion unit which converts the image data acquired by the image data acquirement unit, for each pixel of the image data, into printing data relating to at least either of a presence and an absence of a dot, a printing head grasp unit which grasps characteristic information of the printing head, and a printing unit which executes printing based on the data obtained by the data conversion unit. Further, this program-causes the data conversion unit to function so as to, when the occurrence of a banding phenomenon is forecasted based on the characteristic information of the printing head grasped by the printing head grasp unit, convert the image data so that the size of a part or all dots associated with the banding phenomenon is larger than the size of a dot when the occurrence of the banding phenomenon is not forecasted.

Hereby, similarly to the case in the third aspect, the banding phenomenon caused by the so-called splash bending phenomenon can be removed or made nearly inconspicuous. Namely, like an aspect which will be described later, by making the size of the dot near the "white streak" larger than the size of the normal dot (dot size when the occurrence of the banding phenomenon is not forecasted), the "white streak" can be removed or made nearly inconspicuous.

Further, similarly to the case in the eleventh aspect, using a computer system included in a printing apparatus such as an ink jet printer, the before-mentioned each unit can be realized by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Fourteenth Aspect

Further, according to a fourteenth aspect of the invention, in the printing program according to the thirteenth aspect, the data conversion unit converts the image data so that regarding a part of dots associated with the banding phenomenon, the large converted dots do not continue adjacently.

Hereby, similarly to the case in the fourth aspect, the "white streak" can be surely removed, and simultaneously the disadvantage that the density at that portion becomes so high that on the contrary, the high density portion is conspicuous can also be avoided.

Further, similarly to the case in the eleventh aspect, using a computer system included in a printing apparatus such as an ink jet printer, the before-mentioned each unit can be realized by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Fifteenth Aspect

Further, according to a fifteenth aspect of the invention, in the printing program according to the thirteenth aspect, the data conversion unit converts, when it makes large the size of the partial dot associated with the banding phenomenon, the image data so that a dot near the dot changed large is not printed.

Hereby, similarly to the case in the fifth aspect, not only the "white streak" and the "dark streak" caused by the banding phenomenon can be removed or made nearly inconspicuous, but also the area tone at its correction part is not different greatly from that at the other part. Therefore, traces of the processing can be surely removed.

Further, similarly to the case in the eleventh aspect, using a computer system included in a printing apparatus such as an ink jet printer, the before-mentioned each unit can be realized by software. Therefore, compared with a case in which a dedicated hardware is created to realize the afore-mentioned each unit; the afore-mentioned each unit can be realized economically and readily. Further, by rewriting a part of the program, version-up by change and improvement of function can be readily performed.

Sixteenth Aspect

According to a sixteenth aspect of the invention, a printing program is used in a printing apparatus that prints plural dots on a-printing medium by a printing head thereby to form a predetermined image, wherein a computer is caused to function as an image data acquirement unit which acquires image data corresponding to the predetermined image, a data conversion unit which converts the image data acquired by the image data acquirement unit, for each pixel of the image data, into printing data relating to at least either of a presence and an absence of a dot, a printing head grasp unit which grasps characteristic information of the printing head, and a printing unit which executes printing based on the data obtained by the data conversion unit. Further, this program causes the data conversion unit to function so as to, when the occurrence of a banding phenomenon is forecasted based on the characteristic information of the printing head grasped by the printing head grasp unit, convert the image data so that the size of a part or all dots associated with the banding phenomenon is smaller than the size of a dot when the occurrence of the banding phenomenon is not forecasted.

Hereby, similarly to the case in the sixth aspect, by making the size of the dot near the "dark streak" smaller than the size of the normal dot, the "dark streak" can be removed or made nearly inconspicuous.

Further, similarly to the case in the eleventh aspect, using a computer system included in a printing apparatus such as an ink jet printer, the before-mentioned each unit can be realized by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Seventeenth Aspect

Further, according to a seventeenth aspect of the invention, in the printing apparatus according to the sixteenth aspect, the data conversion unit converts the image data so that regarding a part of dots associated with the banding phenomenon, the small converted dots do not continue adjacently.

Hereby, similarly to the case in the seventh aspect, the "dark streak" can be surely removed; and simultaneously the disadvantage that the density at that portion becomes so low that on the contrary, the low density portion is conspicuous can also be avoided.

Further, similarly to the case in the eleventh aspect, using a computer system included in a printing apparatus such as an ink jet printer, the before-mentioned each unit can be realized by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Eighteenth Aspect

Further, according to an eighteenth aspect of the invention, in the printing program according to any of the eleventh to seventeenth aspects, the data conversion unit, when changing the size of the dot associated with the banding phenomenon, diffuses the error between the dot size when the size is not changed and the dot size after change into a dot which has not been processed yet, and converts, based on the value after diffusion, the size of the dot.

Hereby, similarly to the case in the eighth aspect, not only the area tone at the correction part can be made the same as that at the other part, but also the boundary between the correction part and the other part becomes inconspicuous, so that a more natural image can be obtained.

Further, similarly to the case in the eleventh aspect, using a computer system included in a printing apparatus such as an ink jet printer, the before-mentioned each unit can be realized by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Nineteenth Aspect

Further, according to a nineteenth aspect of the invention, a computer-readable recording medium records the printing program according to any of the eleventh to eighteenth aspects.

Hereby, the printing program can be readily be given and received through the recording medium such as CD-ROM, DVD-ROM, and FD.

Twentieth Aspect

Next, according to a twentieth aspect of the invention, a printing method of printing plural dots on a printing medium by a printing head thereby to form a predetermined image, comprises: an image data acquirement step of acquiring image data corresponding to the predetermined image; a data conversion step of converting the image data acquired by the image data acquirement unit, for each pixel of the image data, into printing data relating to at least either of a presence and an absence of a dot; a printing head grasp step of grasping characteristic information of the printing head; and a printing step which executes printing based on the data obtained in the data conversion step. Herein, in the data conversion step, when the occurrence of a banding phenomenon is forecasted based on the characteristic information of the printing head grasped in the printing head grasp step, the image data is converted so that the size of a part or all dots associated with the banding phenomenon is changed from the size of a dot when the occurrence of a banding phenomenon is not forecasted.

Hereby, similarly to the case in the first aspect, the "white streak" and the "dark streak" can be reduced, and the banding phenomenon caused by the splash bending phenomenon can be removed or made nearly inconspicuous.

Twenty-First Aspect

Further, according to a twenty-first aspect of the invention, a printing method of printing plural dots on a printing medium by a printing head thereby to form a predetermined image, comprises: an image data acquirement step of acquiring image data corresponding to the predetermined image; a data conversion step of converting the image data acquired by the image data acquirement unit, for each pixel of the image data, into printing data relating-to at least either of a presence and an absence of a dot; a printing head grasp step of grasping characteristic information of the printing head; and a printing step of executing printing based on the data obtained in the data conversion step. Herein, in the data conversion step, when there is a point in which the splash bending amount obtained based on the characteristic information of the printing head grasped in the printing head grasp step is larger than a predetermined threshold, the image data is converted so that the size of a part or all dots associated with the splash bending phenomenon is changed to the size different from the size of a dot when the splash bending amount is smaller than the predetermined threshold.

Hereby, similarly to the case in the second aspect, the banding phenomenon caused by the so-called splash bending phenomenon can be removed or made nearly inconspicuous.

Twenty-Second Aspect

Further, according to a twenty-second aspect of the invention, a printing method of printing plural dots on a printing medium by a printing head thereby to form a predetermined image, comprises: an image data acquirement step of acquiring image data corresponding to the predetermined image; a data conversion step of converting the image data acquired by the image data acquirement unit, for each pixel of the image data, into printing data relating to at least either of a presence and an absence of a dot; a printing head grasp step of grasping characteristic information of the printing head; and a printing step of executing printing based on the data obtained in the data conversion step. Herein, in the data conversion step, when the occurrence of a banding phenomenon is forecasted based on the characteristic information of the printing head grasped in the printing head grasp step, the image data is converted so that the size of a part or all dots associated with the banding phenomenon is larger than the size of a dot when the occurrence of the banding phenomenon is not forecasted.

Hereby, similarly to the case in the third aspect, the banding phenomenon caused by the so-called splash bending phenomenon can be removed or made nearly inconspicuous. Namely, like an aspect which will be described, by making the size of the dot near the "white streak" larger than the size of the normal dot (dot size when the occurrence of the banding phenomenon is not forecasted), the "white streak" can be removed or made nearly inconspicuous.

Twenty-Third Aspect

Further, according to a twenty-third aspect of the invention, in the printing method according to the twenty-second aspect, in the data conversion step, the image data is converted so that regarding a part of dots associated with the banding phenomenon, the large converted dots do not continue adjacently.

Hereby, similarly to the case in the fourth aspect, the "white streak" can be surely removed, and simultaneously the disadvantage that the density at that portion becomes so high that on the contrary, the high density portion is conspicuous can also be avoided.

Twenty-Fourth Aspect

Further, according to a twenty-fourth aspect of the invention, in the printing method according to the twenty-second aspect, in the data conversion step, when the size of the partial dot associated with the banding phenomenon is made large, the image data is converted so that a dot near the large changed dot is not printed.

Hereby, similarly to the case in the fifth aspect, not only the "white streak" and the "dark streak" caused by the banding phenomenon can be removed or made nearly inconspicuous, but also the area tone at the correction part is not different greatly from that at the other part. Therefore, traces of the processing can be surely removed.

Twenty-Fifth Aspect

According to a twenty-fifth aspect of the invention, a printing method of printing plural dots on a printing medium by a printing head thereby to form a predetermined image, comprises: an image data acquirement step of acquiring image data corresponding to the predetermined image; a data conversion step of converting the image data acquired by the image data acquirement unit, for each pixel of the image data, into printing data relating to at least either of a presence and an absence of a dot; a printing head grasp step of grasping characteristic information of the printing head; and a printing step of executing printing based on the data obtained in the data conversion step. Herein, in the data conversion step, when the occurrence of a banding phenomenon is forecasted based on the characteristic information of the printing head grasped in the printing head grasp step, the image data is converted so that the size of a part or all dots associated with the banding phenomenon is smaller than the size of a dot when the occurrence of the banding phenomenon is not forecasted.

Hereby, similarly to the case in the sixth aspect, by making the size of the dot near the "dark streak" smaller than the size of the normal dot, the "dark streak" can be removed or made nearly inconspicuous.

Twenty-Sixth Aspect

Further, according to a twenty-sixth aspect of the invention, in the printing method according to the twenty-fifth aspect, in the data conversion step, the image data is converted so that regarding a part of dots associated with the banding phenomenon, the small converted dots do not continue adjacently.

Hereby, similarly to the case in the seventh aspect, the "dark streak" can be surely removed, and simultaneously the disadvantage that the density at that portion becomes so low that on the contrary, the low density portion is conspicuous can also be avoided.

Twenty-Seventh Aspect

Further, according to an twenty-seventh aspect of the invention, in the printing method according to any of the twentieth to twenty-sixth aspects, in the data conversion step, when the size of the dot associated with the banding phenomenon is changed, the error between the dot size when the size is not changed and the dot size after change is diffused into a dot which has not been processed yet, and, based on the value after diffusion, the size of the dot is converted.

Hereby, similarly to the case in the eighth aspect, not only the area tone at the correction part can be made the same as that at the other part, but also the boundary between the correction part and the other part becomes inconspicuous, so that a more natural image can be obtained.

Twenty-Eighth Aspect

Next, according to a twenty-eighth aspect of the invention, a printing data generating apparatus which generates printing data used in a printing apparatus which prints plural dots on a printing medium by a printing head thereby to form a predetermined image, comprises: an image data acquirement unit which acquires image data corresponding to the predetermined image; a data conversion unit which converts the image data acquired by the image data acquirement unit, for each pixel of the image data, into printing data relating to at least either of a presence and an absence of a dot; and a printing head grasp unit which grasps characteristic information of the printing head. Herein, the data conversion unit, when the occurrence of a banding phenomenon is forecasted based on the characteristic information of the printing head grasped by the printing head grasp unit, converts the image data so that the size of a part or all dots associated with the banding phenomenon is changed to the size different from the size of a dot when the occurrence of a banding phenomenon is not forecasted.

Namely, in this aspect, a printing unit for executing printing actually, such as the printing apparatus is not included, but only printing data according to the characteristic of the printing head is generated simply based on the original multi-valued image data.

Therefore, by only sending the printing data generated in this aspect to the printing apparatus, the existing ink jet type printing apparatus can be utilized as it is. Further, similarly to the case in the first aspect, a printing of high quality in which the white streak or the dark streak is made nearly inconspicuous can be readily obtained.

Further, since a widely-used information processing apparatus such as a personal computer can be utilized, the existing printing system comprising a print instruction apparatus such as a personal computer and an ink jet printer can be utilized as it is.

Twenty-Ninth Aspect

According to a twenty-ninth aspect of the invention, a printing data generating apparatus which generates printing data used in a printing apparatus which prints plural dots on a printing medium by a printing head thereby to form a predetermined image, comprises: an image data acquirement unit which acquires image data corresponding to the predetermined image; a data conversion unit which converts the image data acquired by the image data acquirement unit, for each pixel of the image data, into printing data relating to at least either of a presence and an absence of a dot; and a printing head grasp unit which grasps characteristic information of the printing head. Herein, the data conversion unit, when there is a point in which the splash bending amount obtained based on the characteristic information of the printing head grasped by the printing head grasp unit is larger than a predetermined threshold, converts the image data so that the size of a part or all dots associated with the splash bending phenomenon is changed to the size different from the size of a dot when the splash bending amount is smaller than the predetermined threshold.

Hereby, similarly to the case in the, twenty-eighth aspect, by only sending the printing data to the printing apparatus, the existing ink jet type printing apparatus can be utilized as it is. Further, similarly to the case in the first aspect, a printing of high quality in which the white streak or the dark streak is made nearly inconspicuous can be readily obtained. Further, since a widely-used information processing apparatus such as a personal computer can be utilized, the existing printing system comprising a print instruction apparatus such as a personal computer and an ink jet printer can be utilized as it is.

Thirtieth Aspect

According to a thirtieth aspect of the invention, a printing data generating apparatus which generates printing data used in a printing apparatus which prints plural dots on a printing medium by a printing head thereby to form a predetermined image, comprises: an image data acquirement unit which acquires image data corresponding to the predetermined image; a data conversion unit which converts the image data acquired by the image data acquirement unit, for each pixel of the image data, into printing data relating to at least either of a presence and an absence of a dot; a printing head grasp unit which grasps characteristic information of the printing head; and a printing unit which executes printing based on the data obtained by the data conversion unit. Herein, the data conversion unit, when the occurrence of a banding phenomenon is forecasted based on the characteristic information of the printing head grasped by the printing head grasp unit, converts the image data so that the size of a part or all dots associated with the banding phenomenon is larger than the size of a dot when the occurrence of the banding phenomenon is not forecasted.

Hereby, the banding phenomenon caused by the so-called splash bending phenomenon can be removed or made nearly inconspicuous.

Thirty-First Aspect

Further, according to a thirty-first aspect of the invention, in the printing data generating apparatus according to the thirtieth aspect, the data conversion unit converts the image data so that regarding a part of dots associated with the banding phenomenon, the large converted dots do not continue adjacently.

Hereby, the "white streak" can be surely removed, and simultaneously the disadvantage that the density at that portion becomes so high that on the contrary, the high density portion is conspicuous can also be avoided.

Thirty-Second Aspect

Further, according to a thirty-second aspect of the invention, in the printing data generating apparatus according to the thirty-first aspect, the data conversion unit converts, when it makes large the size of the partial dot associated with the banding phenomenon, the image data so that a dot near the large changed dot is not printed.

Hereby, since the area tone at the correction part can be kept nearly the same as that at the normal part, the "white streak" and the "dark streak" caused by the banding phenomenon can be removed or made nearly inconspicuous. Further, since the area tone at that part is not different greatly from that at the other part, traces of the processing can be surely removed.

Thirty-Third Aspect

According to a thirty-third aspect of the invention, a printing data generating apparatus which generates printing data used in a printing apparatus which prints plural dots on a printing medium by a printing head thereby to form a predetermined image, comprises: an image data acquirement unit which acquires image data corresponding to the predetermined image; a data conversion unit which converts the image data acquired by the image data acquirement unit, for each pixel of the image data, into printing data relating to at least either of a presence and an absence of a dot; and a printing head grasp unit which grasps characteristic information of the printing head. Herein, the data conversion unit, when the occurrence of a banding phenomenon is forecasted based on the characteristic information of the printing head grasped by the printing head grasp unit, converts the image data so that the size of a part or all dots associated with the banding phenomenon is smaller than the size of a dot when the occurrence of the banding phenomenon is not forecasted.

Hereby, the banding phenomenon caused by the so-called splash bending phenomenon can be removed or made nearly inconspicuous. Namely, like an aspect which will be described later, by making the size of the dot near the "dark streak" smaller than the size of the normal dot (dot size when the occurrence of the banding phenomenon is not forecasted), the "dark streak" can be removed or made nearly inconspicuous.

Thirty-Fourth Aspect

Further, according to a thirty-fourth aspect of the invention, in the printing data generating apparatus according to the thirty-third aspect, the data conversion unit converts the image data so that regarding a part of dots associated with the banding phenomenon, the small converted dots do not continue adjacently.

When the data conversion unit thus makes the size of the dot associated with the banding phenomenon small, the small-sized dots are adjacently formed not continuously. Hereby, the "dark streak" can be surely removed, and simultaneously the disadvantage that the density at that portion becomes so low that on the contrary, the low density portion is conspicuous can also be avoided.

Thirty-Fifth Aspect

Further, according to a thirty-fifth aspect of the invention, in the printing data generating apparatus according to any of the twenty-seventh to thirty-fourth aspects, the data conversion unit, when changing the size of the dot associated with the banding phenomenon, diffuses the error between the dot size when the size is not changed and the dot size after change into a dot which has not been processed yet, and converts, based on the value after diffusion, the size of the dot.

Hereby, not only the area tone at the correction part can be made the same as that at the other part, but also the boundary between the correction part and the other part becomes inconspicuous, so that a more natural image can be obtained.

Thirty-Sixth Aspect

Next, according to a thirty-sixth aspect of the invention, a printing data generating program generates printing data used in a printing apparatus that prints plural dots on a printing medium by a printing head thereby to form a predetermined image, wherein a computer is caused to function as an image data acquirement unit which acquires image data corresponding to the predetermined image, a data conversion unit which converts the image data acquired by the image data acquirement unit, for each pixel of the image data, into printing data relating to at least either of a presence and an absence of a dot, and a printing head grasp unit which grasps characteristic information of the printing head. Further, this program causes the data conversion unit to function so as to, when the occurrence of a banding phenomenon is forecasted based on the characteristic information of the printing head grasped by the printing head grasp unit, convert the image data so that the size of a part or all dots associated with the banding phenomenon is changed from the size of a dot when the occurrence of the banding phenomenon is not forecasted.

Hereby, similarly to the case in the twenty-seventh aspect, the "white streak" and the "dark streak" can be reduced, and the banding phenomenon caused by the splash bending phenomenon can be removed or made nearly inconspicuous.

Further, the afore-mentioned each unit can be realized using a computer system normally provided in a personal computer or an ink jet printer by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Thirty-Seventh Aspect

Further, according to a thirty-seventh aspect of the invention, a printing data generating program generates printing data used in a printing apparatus that prints plural dots on a printing medium by a printing head thereby to form a predetermined image, wherein a computer is caused to function as an image data acquirement unit which acquires image data corresponding to the predetermined image, a data conversion unit which converts the image data acquired by the image data acquirement unit, for each pixel of the image data, into printing data relating to at least either of a presence and an absence of a dot, and a printing head grasp unit which grasps characteristic information of the printing head. Further, this program causes the data conversion unit to function so as to, when there is a point in which the splash bending amount obtained based on the characteristic information of the printing head grasped by the printing head grasp unit is larger than a predetermined threshold, convert the image data so that the size of a part or all dots associated with the splash bending phenomenon is changed to the size different from the size of a dot when the splash bending amount is smaller than the predetermined threshold.

Hereby, similarly to the case in the twenty-eighth aspect, the banding phenomenon caused by the so-called splash bending phenomenon can be removed or made nearly inconspicuous.

Further, similarly to the case in the thirty-sixth aspect, the afore-mentioned each unit can be realized using a computer system normally provided in a personal computer or an ink jet printer by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Thirty-Eighth Aspect

Further, according to a thirty-eighth aspect of the invention, a printing data generating program generates printing data used in a printing apparatus that prints plural dots on a printing medium by a printing head thereby to form a predetermined image, wherein a computer is caused to function as an image data acquirement unit which acquires image data corresponding to the predetermined image, a data conversion unit which converts the image data acquired by the image data acquirement unit, for each pixel of the image data, into printing data relating to at least either of a presence and an absence of a dot, and a printing head grasp unit which grasps characteristic information of the printing head. Further, this program causes the data conversion unit to function so as to, when the occurrence of a banding phenomenon is forecasted based on the characteristic information of the printing head grasped by the printing head grasp unit, convert the image data so that the size of a part or all dots associated with the banding phenomenon is larger than the size of a dot when the occurrence of the banding phenomenon is not forecasted.

Hereby, similarly to the case in the twenty-ninth aspect, the banding phenomenon caused by the so-called splash bending phenomenon can be removed or made nearly inconspicuous.

Further, similarly to the case in the thirty-sixth aspect, the afore-mentioned each unit can be realized using a computer system normally provided in a personal computer or an ink jet printer by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Thirty-Ninth Aspect

Further, according to a thirty-ninth aspect of the invention, in the printing data generating program according to the thirty-eighth aspect, the data conversion unit converts the image data so that regarding a part of dots associated with the banding phenomenon, the large converted dots do not continue adjacently.

Hereby, similarly to the case in the thirtieth aspect, the "white streak" can be surely removed, and simultaneously the disadvantage that the density at that portion becomes so high that on the contrary, the high density portion is conspicuous can also be avoided.

Further, similarly to the case in the thirty-sixth aspect, the afore-mentioned each unit can be realized using a computer system normally provided in a personal computer or an ink jet printer by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Fortieth Aspect

Further, according to a fortieth aspect of the invention, in the printing data generating program according to the thirty-eighth aspect, the data conversion unit converts, when it makes large the size of the partial dot associated with the banding phenomenon, the image data so that a dot near the large changed dot is not printed.

Hereby, similarly to the case in the thirty-first aspect, not only the "white streak" and the "dark streak" caused by the banding phenomenon can be removed or made nearly inconspicuous, but also the area tone at that part is not different greatly from that at the other part. Therefore, traces of the processing can be surely removed.

Further, similarly to the case in the thirty-sixth aspect, the afore-mentioned each unit can be realized using a computer system normally provided in a personal computer or an ink jet printer by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Forty-First Aspect

According to a forty-first aspect of the invention, a printing data generating program generates printing data used in a printing apparatus that prints plural dots on a printing medium by a printing head thereby to form a predetermined image, wherein a computer is caused to function as an image data acquirement unit which acquires image data corresponding to the predetermined image, a data conversion unit which converts the image data acquired by the image data acquirement unit, for each pixel of the image data, into printing data relating to at least either of a presence and an absence of a dot, and a printing head grasp unit which grasps characteristic information of the printing head. Further, this program causes the data conversion unit to function so as to, when the occurrence of a banding phenomenon is forecasted based on the characteristic information of the printing head grasped by the printing head grasp unit, convert the image data so that the size of a part or all dots associated with the banding phenomenon is smaller than the size of a dot when the occurrence of the banding phenomenon is not forecasted.

Hereby, similarly to the case in the thirty-second aspect, by making the size of the dot near the "dark streak" smaller than the size of the normal dot, the "dark streak" can be removed or made nearly inconspicuous.

Further, similarly to the case in the thirty-sixth aspect, the afore-mentioned each unit can be realized using a computer system normally provided in a personal computer or an ink jet printer by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Forty-Second Aspect

According to a forty-second aspect of the invention, in the printing data generating program according to the forty-first aspect, the data conversion unit converts the image data so that regarding a part of dots associated with the banding phenomenon, the small converted dots do not continue adjacently.

Hereby, similarly to the case in the thirty-third aspect, the "dark streak" can be surely removed, and simultaneously the disadvantage that the density at that portion becomes so low that on the contrary, the low density portion is conspicuous can also be avoided.

Further, similarly to the case in the thirty-sixth aspect, the afore-mentioned each unit can be realized using a computer system normally provided in a personal computer or an ink jet printer by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Forty-Third Aspect

According to a forty-third aspect, in the printing data generating program according to any of the thirty-sixth to forty-second aspects, the data conversion unit, when changes the size of the dot associated with the banding phenomenon, diffuses the error between the dot size when the size is not changed and the dot size after change into a dot which has not been processed yet, and converts, based on the value after diffusion, the size of the dot.

Hereby, similarly to the case in the thirty-fourth, not only the area tone at the correction part can be made the same as that at the other part, but also the boundary between the correction part and the other part becomes inconspicuous, so that a more natural image can be obtained.

Further, similarly to the case in the thirty-sixth aspect, the afore-mentioned each unit can be realized using a computer system normally provided in a personal computer or an ink jet printer by software. Therefore, compared with a case in which a dedicated hardware is created to realize the afore-mentioned each unit, the afore-mentioned each unit can be realized economically and readily. Further, by rewriting a part of the program, version-up by change and improvement of function can be readily performed.

Forty-Fourth Aspect

Further, according to a forty-fourth aspect of the invention, a computer-readable recording medium records the printing data generating program according to any of the thirty-sixth to forty-third aspects.

Hereby, the printing program can be readily be given and received through the recording medium such as CD-ROM, DVD-ROM, and FD.

Forty-Fifth Aspect

Next, according to a forty-fifth aspect of the invention, a printing data generating method of generating printing data used in a printing apparatus which prints plural dots on a printing medium by a printing head thereby to form a predetermined image, comprises: an image data acquirement step of acquiring image data corresponding to the predetermined image; a data conversion step of converting the image data acquired in the image data acquirement step, for each pixel of the image data, into printing data relating to at least either of a presence and an absence of a dot; and a printing head grasp step of grasping characteristic information of the printing head. Herein, in the data conversion step, when the occurrence of a banding phenomenon is forecasted based on the characteristic information of the printing head grasped in the printing head grasp step, the image data is converted so that the size of a part or all dots associated with the banding phenomenon is changed from the size of a dot when the occurrence of a banding phenomenon is not forecasted.

Hereby, similarly to the case in the twenty-seventh aspect, the "white streak" and the "dark streak" can be reduced, and the banding phenomenon caused by the splash bending phenomenon can be removed or made nearly inconspicuous.

Forty-Sixth Aspect

Further, according to a forty-sixth aspect of the invention, a printing data generating method which generates printing data used in a printing apparatus that prints plural dots on a printing medium by a printing head thereby to form a predetermined image, comprises: an image data acquirement step of acquiring image data corresponding to the predetermined image; a data conversion step of converting the image data acquired by the image data acquirement unit, for each pixel of the image data, into printing data relating to at least either of a presence and an absence of a dot; and a printing head grasp step of grasping characteristic information of the printing head. Herein, in the data conversion step, when there is a point in which the splash bending amount obtained based on the characteristic information of the printing head grasped in the printing head grasp step is larger than a predetermined threshold, the image data is converted so that the size of a part or all dots associated with the splash bending phenomenon is changed to the size different from the size of a dot when the splash bending amount is smaller than the predetermined threshold.

Hereby, similarly to the case in the twenty-eighth aspect, the banding phenomenon caused by the so-called splash bending phenomenon can be removed or made nearly inconspicuous.

Forty-Seventh Aspect

Further, according to a forty-seventh aspect of the invention, a printing data generating method which generates printing data used in a printing apparatus that prints plural dots on a printing medium by a printing head thereby to form a predetermined image, comprises: an image data acquirement step acquiring image data corresponding to the predetermined image; a data conversion step of converting the image data acquired by the image data acquirement unit, for each pixel of the image data, into printing data relating to at least either of a presence and an absence of a dot; and a printing head grasp step of grasping characteristic information of the printing head. Herein, in the data conversion step, when the occurrence of a banding phenomenon is forecasted based on the characteristic information of the printing head grasped by the printing head grasp unit, the image data is converted so that the size of a part or all dots associated with the banding phenomenon is larger than the size of a dot when the occurrence of the banding phenomenon is not forecasted.

Hereby, similarly to the case in the twenty-ninth aspect, the banding phenomenon caused by the so-called splash bending phenomenon can be removed or made nearly inconspicuous.

Forty-Eighth Aspect

Further, according to a forty-eighth aspect of the invention, in the printing data generating method according to the forty-seventh aspect, in the data conversion step, the image data is converted so that regarding a part of dots associated with the banding phenomenon, the large converted dots do not continue adjacently.

Hereby, similarly to the case in the thirtieth aspect, the "white streak" can be surely removed, and simultaneously the disadvantage that the density at that portion becomes so high that on the contrary, the high density portion is conspicuous can also be avoided.

Forty-Ninth Aspect

Further, according to a forty-ninth aspect of the invention, in the printing data generating method according to the forty-seventh aspect, in the data conversion step, when the size of the partial dot associated with the banding phenomenon is made large, the image data is converted so that a dot near the large changed dot is not printed.

Hereby, similarly to the case in the thirty-first aspect, not only the "white streak" and the "dark streak" caused by the banding phenomenon can be removed or made nearly inconspicuous, but also the area tone at that part is not different greatly from that at the other part: Therefore, traces of the processing can be surely removed.

Fiftieth Aspect

According to a fiftieth aspect of the invention, a printing data generating method which generates printing data used in a printing apparatus that prints plural dots on a printing medium by a printing head thereby to form a predetermined image, comprises: an image data acquirement step of acquiring image data corresponding to the predetermined image; a data conversion step of converting the image data acquired in the image data acquirement step, for each pixel of the image data, into printing data relating to at least either of a presence and an absence of a dot; and a printing head grasp step of grasping characteristic information of the printing head. Herein, in the data conversion step, when the occurrence of a banding phenomenon is forecasted based on the characteristic information of the printing head grasped by the printing head grasp unit, the image data is converted so that the size of a part or all dots associated with the banding phenomenon is smaller than the size of a dot when the occurrence of the banding phenomenon is not forecasted.

Hereby, similarly to the case in the thirty-second aspect, by making the size of the dot near the "dark streak" smaller than the size of the normal dot, the "dark streak" can be removed or made nearly inconspicuous.

Fifty-First Aspect

Further, according to a fifty-first aspect of the invention, in the printing data generating method according to the fiftieth aspect, in the data conversion step, the image data is converted so that regarding a part of dots associated with the banding phenomenon, the small converted dots do not continue adjacently.

Hereby, similarly to the case in the thirty-second aspect, the "dark streak" can be surely removed, and simultaneously the disadvantage that the density at that portion becomes so low that on the contrary, the low density portion is conspicuous can also be avoided.

Fifty-Second Aspect

Further, according to a fifty-second aspect of the invention, in the printing data generating method according to any of the forty-fifth to fifty-first aspects, in the data conversion step, when the size of the dot associated with the banding phenomenon is changed, the error between the dot size when the size is not changed and the dot size after change is diffused into a dot which has not been processed yet, and, based on the value after diffusion, the size of the dot is converted.

Hereby, similarly to the case in the eighth aspect, not only the area tone at the correction part can be made the same as that at the other part, but also the boundary between the correction part and the other part becomes inconspicuous, so that a more natural image can be obtained.

BRIEF DESCRIPTION OF THE DRAWINGS

The Invention will be described with reference to the accompanying drawings, wherein like numbers reference like elements, and wherein:

FIGS. 12A-C are conceptual illustrations showing a process of size enlargement change of dots formed by the printing processing of the invention;

FIGS. 13A and B are conceptual illustrations showing a process of size reduction change of dots formed by the printing processing of the invention;

DESCRIPTION OF THE EMBODIMENTS

The best mode for carrying out the invention will be described below with reference to the attached drawings.

Figure 1:
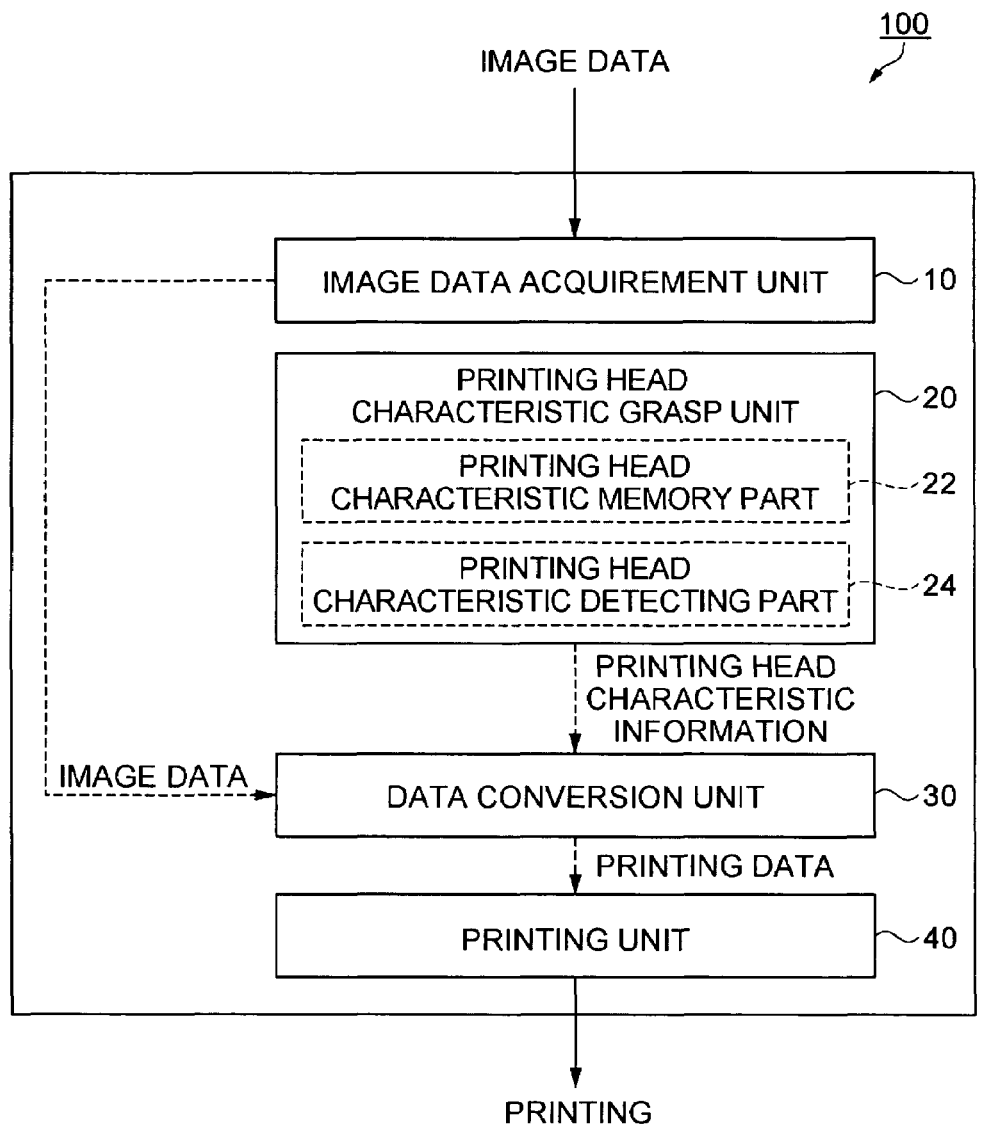
FIG. 1 is a functional block diagram showing one embodiment of a printing apparatus according to the invention.

FIG. 1 is a functional block diagram showing a first embodiment of a printing apparatus 100 according to the invention.

As shown in the drawing, this printing apparatus 100 comprises an image data acquirement unit 10 which acquires a multi-valued image, a printing head characteristic grasp unit 20 which grasps (acquires) a characteristic of a printing head 200 which will be described later, a data conversion unit 30 which converts the image data, according to the characteristic of the printing head grasped by this printing head characteristic grasp unit 20, into binarized data for printing, and an ink jet type printing unit 40 which executes printing based on the data created by this data conversion unit 30.

First, this image data acquirement unit 10 provides a function of acquiring, from a print instruction apparatus such as a not-shown personal computer (PC) or a printer server through a network, digital image data, for example, multi-valued image data of which one pixel is expressed by an 8-bit (0 to 255) tone (luminance value) for each color (R, G, B). Alternatively, the image data acquirement unit 10 provides a function of reading and acquiring the image data directly from an image (data) reading device such as a scanner or a CD-ROM drive which is not shown.

The printing head characteristic acquirement unit 20 provides a function of acquiring a characteristic of the printing head 200 used in the ink jet type printing unit 40 which will be described later. More specifically, as shown in FIGS. 3 and 4, the printing head characteristic acquirement unit 20 fulfills a function of concretely specifying, using a predetermined threshold, whether a splash bending phenomenon occurs or not in the printing head 200 used in the printing unit 40, and which abnormal nozzle N causes the splash bending phenomenon in case that the splash bending phenomenon occurs.

Figure 3:
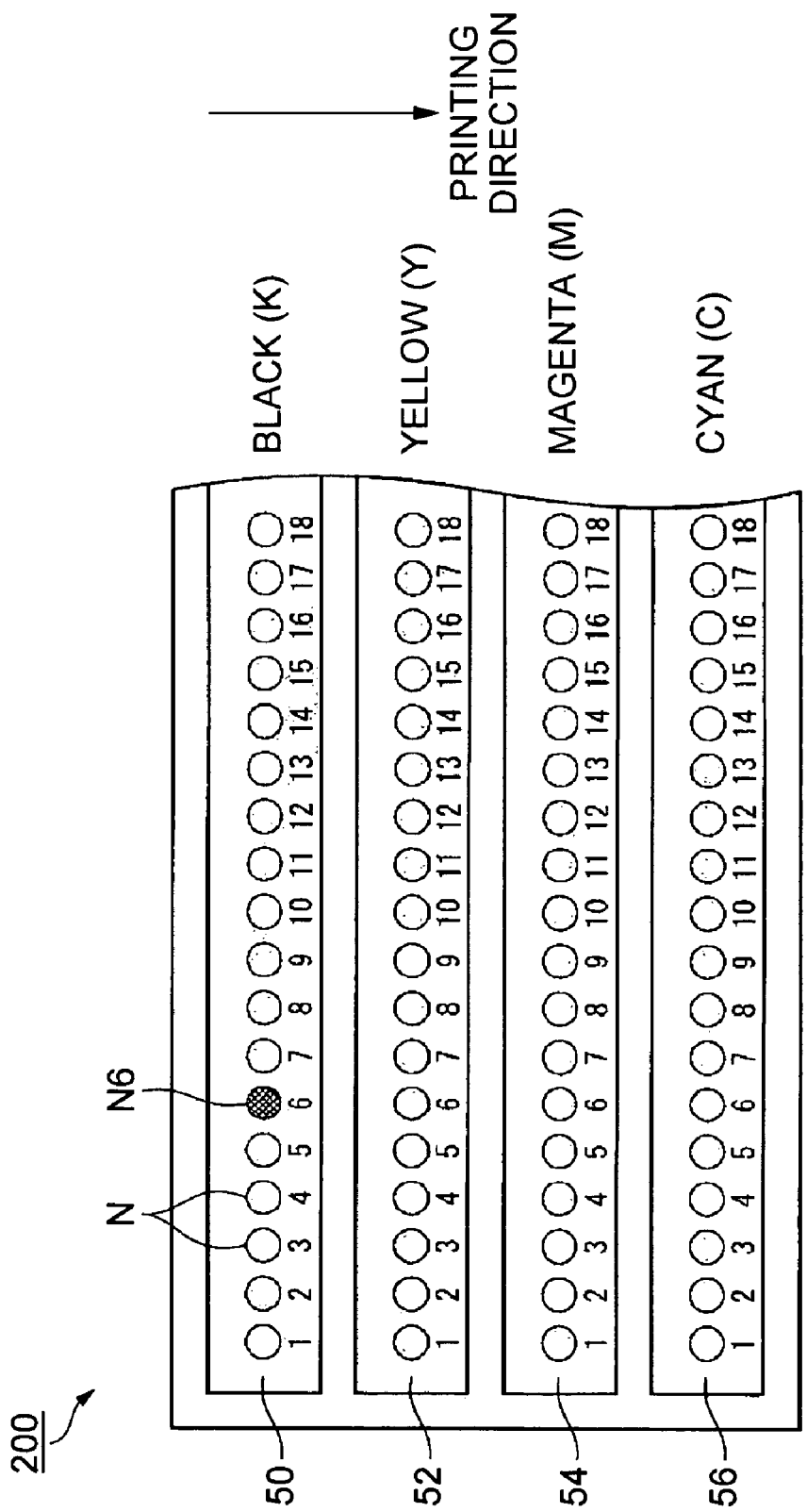
FIG. 3 is an enlarged bottom view showing structure of a printing head according to the invention.
Figure 4:
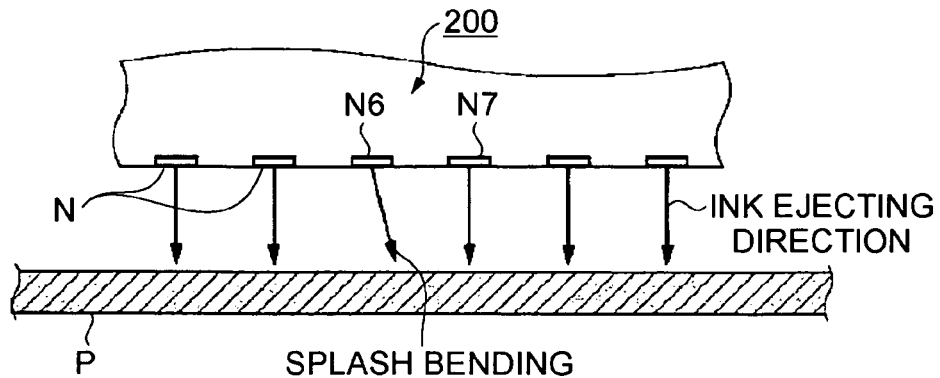
FIG. 4 is an enlarged side view showing the structure of the printing head according to the invention.

FIG. 3 is an enlarged bottom view showing structure of the printing head 200 that is an object of the invention, and FIG. 4 is the enlarged side view of that portion.

As shown in FIG. 3, the printing head 200 includes four nozzle modules 50, 52, 54 and 56 which are arranged integrally so as to be superimposed on each other in a printing direction. These nozzle modules comprise a black nozzle module 50 in which plural nozzles N (18 nozzles in FIG. 3) for ejecting only black (K) ink are linearly arranged, a yellow nozzle module 52 in which plural nozzles N for ejecting only yellow(Y) ink are similarly arranged linearly, a magenta nozzle module 54 in which plural nozzles N for ejecting only magenta (M) ink are similarly arranged linearly, and a cyan nozzle module 56 in which plural nozzles N for ejecting only cyan (C) ink are similarly arranged linearly.

FIG. 4 shows a state in which a sixth nozzle N6 from the left in the black nozzle module 50 of these four nozzle modules 50, 52, 54, and 56 causes a splash bending phenomenon, and ink is ejected in a slanting direction from the nozzle N6 thereby forming a dot near a normal nozzle N7 adjacent to the nozzle N6.

Next, referring back to FIG. 1, the printing head characteristic grasp unit 20 further includes a printing head characteristic memory part 22 or a printing head characteristic detecting part 24. The characteristic of the printing head 200 previously stored in the printing head characteristic memory part 22 is read out, or the characteristic of the printing head 200 detected by the printing head characteristic detecting part 24 is read out, whereby the characteristic of the printing head 200 can be readily acquired at a necessary timing.

Here, the printing head characteristic memory part 22 includes a memory unit such as a readable ROM or RAM in which a result of printing head characteristic test performed in manufacture of the printing head 200 or in incorporation into the printing apparatus 100 has been written. Further, the printing head characteristic detecting part 24, in order to meet a case that the characteristic of the printing head 200 has changed after use, examines the characteristic of the printing head 200 from the printing result by the printing head 200, using an optical printing result reading unit such as a scanner periodically or at the predetermined timing. Thereafter, the printing head characteristic detecting part 24 stores a result of the examination together with the data of the printing head characteristic memory part 22, or stores the result, overwriting the test result onto the data of the printing head characteristic memory part 22. Further, it is known that since the characteristic of this printing head 200 is, in a manufacture stage, fixed to some degree, it is comparatively rare that the characteristic changes after manufacture except bad ejection because of ink clogging.

The data conversion unit 30 provides a function of converting the image data acquired by the image acquirement unit 10 into printing data used in the ink jet type printing unit 40 described later, that is, data relating to whether a dot of the predetermined color is shot for each pixel or not (hereinafter, appropriately referred to as a "binarization" or "halftoning"), which will be described in detail later. In this conversion, the data conversion unit 30 provides a function of converting, in consideration of a presence and an absence of dot formation by the abnormal nozzle detected by the printing head characteristic grasp unit 20 and the normal nozzle near the abnormal nozzle, the image data into optimum printing data.

The printing unit 40 is an ink jet type printer which, while moving either or both of a printing medium (paper) and the printing head 200, ejects ink respectively from the nozzle modules 50, 52, 54, and 56 formed in the printing head 200 in the shape of a dot thereby to form a predetermined image comprising many dots on the printing medium. This printing unit 40 comprises, in addition to the printing head 200, a not-shown printing head feeding mechanism (in case of a multipass type) which reciprocates the printing head 200 on the printing medium (paper) in its width direction, a not-shown paper feeding mechanism for moving the printing medium (paper), and a not-shown print control mechanism which controls ejection of ink from the printing head 200 based on the binarized-data.

Figure 2:
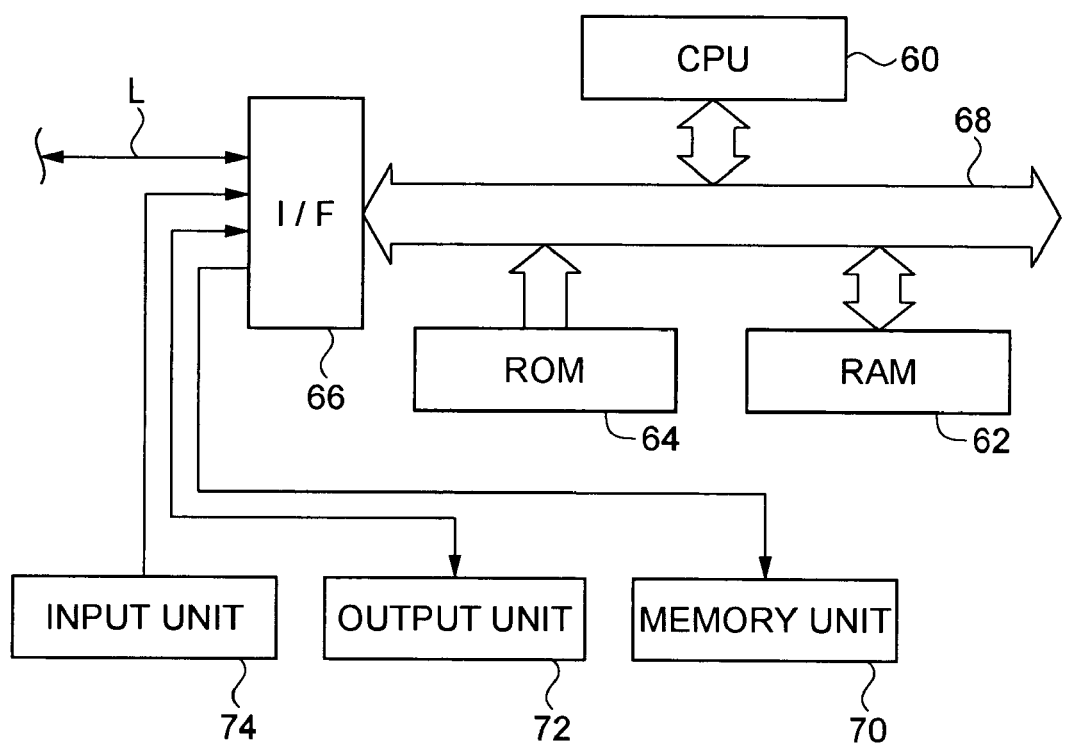
FIG. 2 is a block diagram showing the hardware constitution of a computer system which realizes the printing apparatus according to the invention.

Further, the printing apparatus 100 includes a computer system for realizing, on software, various controls for printing, the binarized data acquirement unit 10, the printing head characteristic grasp unit 20, and the data conversion unit 30. In the hardware constitution of the printing apparatus 100, as shown in FIG. 2, CPU (Central Processing Unit) 60 which performs various control and the operation processing, RAM (Random Access Memory) 62 which constitutes a main memory unit (Main Storage), and ROM (Read Only Memory) 64 are connected through an internal/external bus 68 composed of a PCI (Peripheral Component Interconnect) bus or a ISA (Industrial Standard Architecture) bus. Further, an external memory unit (Secondary Storage) 70 such as HDD, an output unit 72 such as the printing unit 40, CRT, and a LCD monitor, an input unit 74 such as an operational panel, a mouse, a keyboard, a scanner, and a network for performing communication with a not-shown print instruction unit are connected to this bus 68 through an input/output interface (I/F) 66.

When power is switched on, a system program such as BIOS stored in the ROM 64, loads in the RAM 62 various dedicated computer programs previously stored in the ROM 64, or similarly loads various dedicated computer programs installed in the memory unit 70 through a memory medium such as CD-ROM, DVD-ROM, or a flexible disk (FD), or through a communication network L such as the Internet. In accordance with the instruction written in the program loaded in the RAM 62, the CPU 60 freely uses various resources to perform the predetermined control and the operation processing, whereby the before-mentioned functions are realized in the software.

Next, a flow of printing processing using the printing apparatus 100 having such constitution will be described with main reference to the flowcharts in FIGS. 5 and 6. As described before, generally, the printing head 200 can nearly simultaneously form the dots of plural kinds such as four colors and six colors. However, in the following example, in order to make understanding of the description easy, the dots are formed by the printing head 200 of any one color (monochrome) (monochromatic image).

Figure 5:
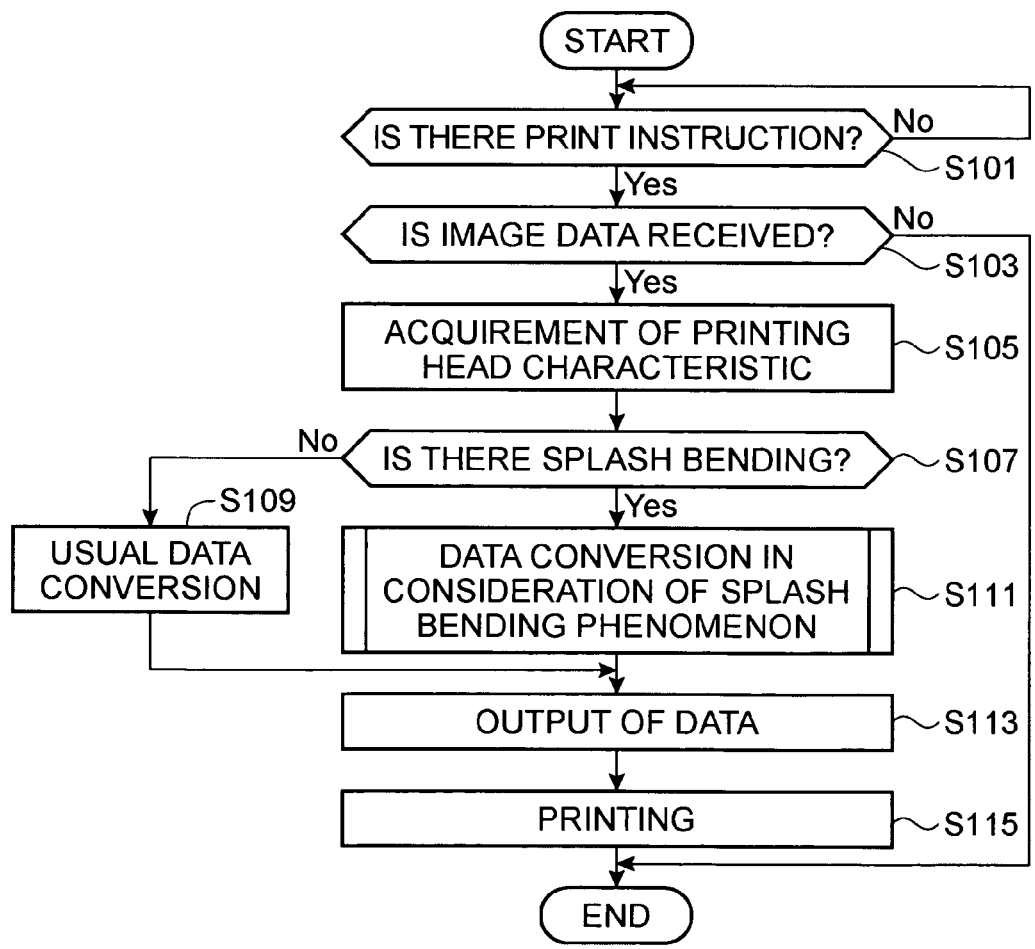
FIG. 5 is a flowchart showing an example of the printing processing according to the invention.

As shown in FIG. 5, first, in the printing apparatus 100, in case that a predetermined initial operation for printing processing has been completed after the power was switched on, the operation proceeds to a first step S101. In case that a print instruction terminal such as PC is connected to the printing apparatus 100, the image data acquirement unit 10 monitors whether the clear printing instruction is given from the print instruction terminal. When it is judged that the printing instruction exists (in case of YES), the operation proceeds to step S103. In step S103, the image data acquirement unit 10 judges whether multi-valued image data that is an object of printing has been sent together with the printing instruction from the print instruction terminal.

As a result, when it is judged that the image data has been sent (in case of YES), the operation proceeds to step S105. In step S105, a printing head characteristic of the printing head 200 of the printing unit 40 itself is acquired by the printing head characteristic grasp unit 20. When it is judged in the judgment step S103 that the printing data has not been sent in the predetermined time (in case of No), the printing apparatus 100 makes a response indicating impossibility of printing to the print instruction terminal, and thereafter the processing ends.

Thereafter, the operation proceeds to judgment step S107. When it is judged from the characteristic of the printing head 200 acquired in step S105 that a splash bending phenomenon does not occur (in case of No), the operation proceeds to step S109 and the usual data conversion (binarization processing) which uses error diffusion processing described later is executed. On the contrary, in judgment step S107, when it is judged that the splash bending phenomenon occurs (in case of Yes), the operation proceeds to step S111 and data conversion processing is executed in consideration of the splash bending phenomenon.

After the data conversion processing in step 109 or step S111 has been completed, the operation proceeds to step S113. In step S113, after the converted data is output as printing data for the printing unit 40, the operation proceeds to step S115 lastly. In step S115, based on the thus outputted printing data, printing is executed by the printing unit 40, whereby the processing ends.

Figure 6:
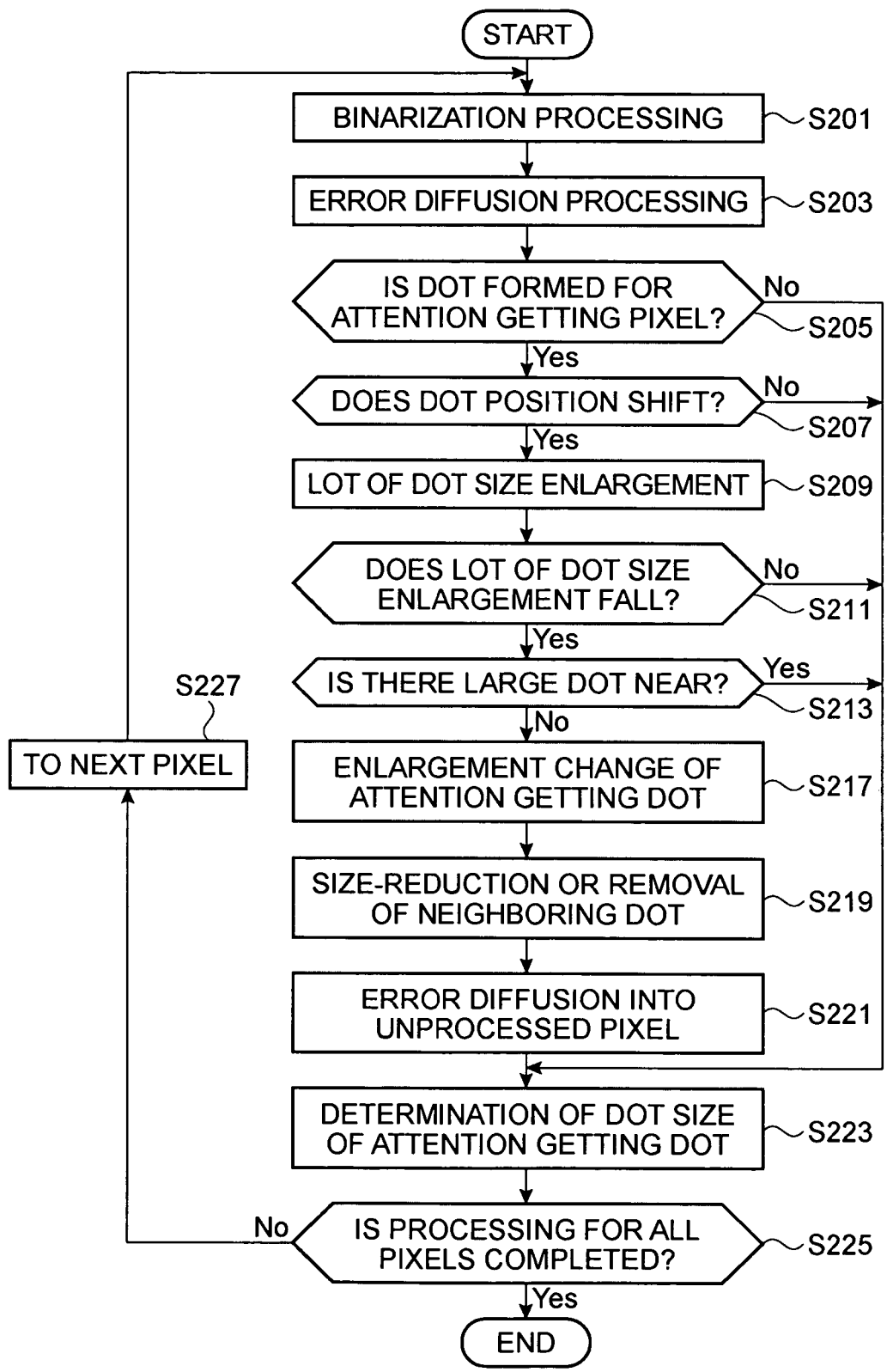
FIG. 6 a flowchart showing an example of the data correction processing according to the invention.

FIG. 6 is a flowchart showing specifically flow of data conversion processing in step S111, which takes the splash bending phenomenon into consideration.

Figure 7:
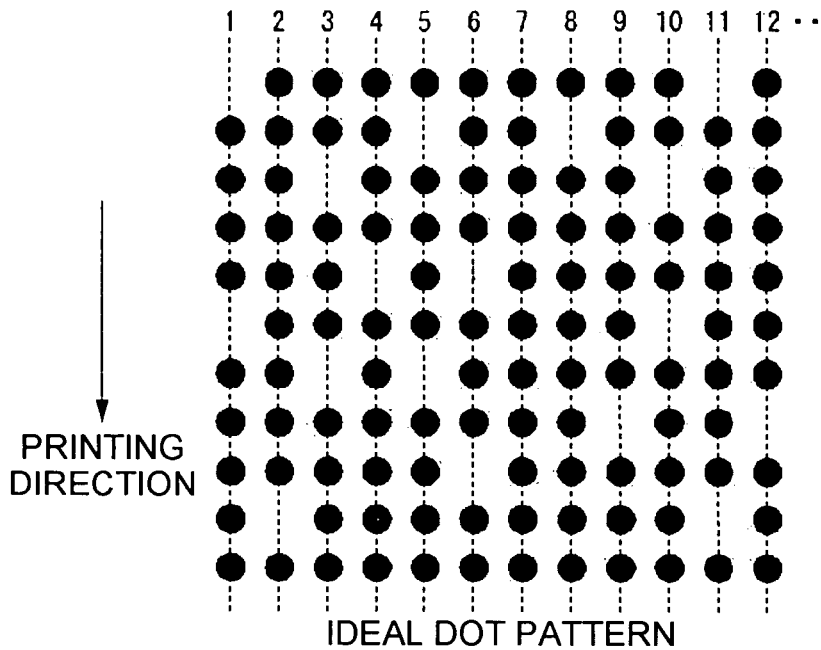
FIG. 7 is a conceptual illustration showing an example of a dot pattern formed by an ideal printing head.
Figure 8:
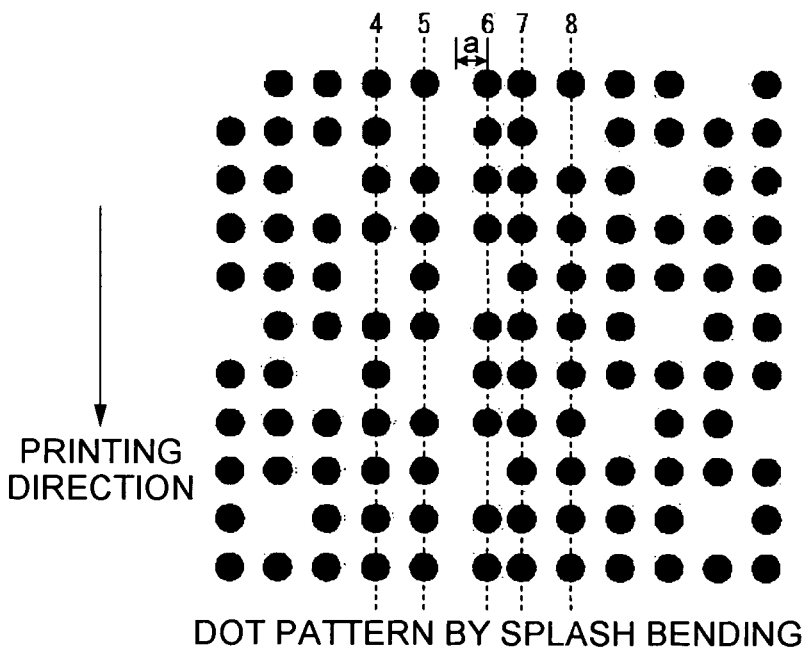
FIG. 8 is a conceptual illustration showing an example of a dot pattern formed by a splash bending phenomenon of one nozzle.

Further, FIG. 7 shows an example of a dot pattern formed by only the black nozzle module 50 in the normal printing head 20 having no abnormal nozzles which cause the so-called splash bending phenomenon. FIG. 8 shows a state in which the nozzle N6 in the black nozzle module 50 causes the splash bending phenomenon as shown in FIG. 4 and dots formed by the nozzle N6 are shifted to the side of dots formed by the normal nozzle N7 located at a neighbor to the right of the nozzle N6 by distance a. As a result, between the dots formed by the nozzle N6 and dots formed by a nozzle N5 located at a neighbor to the left of the nozzle N6, a "white streak" extending in the printing direction (paper feeding direction) occurs.

Such a "white streak" is more remarkably conspicuous in case of a so-called "solid painted" printing, and particularly in case of a combination that printing paper is white and ink is black in which luminance is extremely different, which extremely worsens the quality of the printing.

Figure 9:
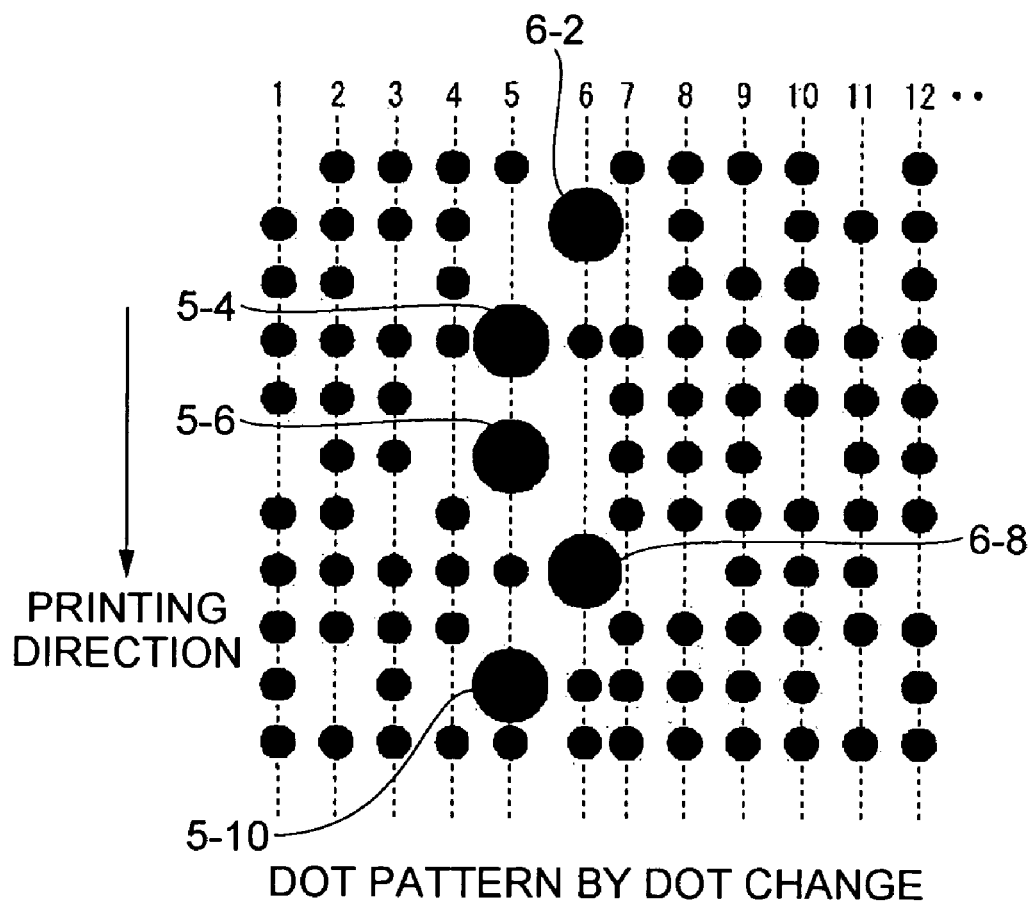
FIG. 9 is a conceptual illustration showing an example of a dot pattern by changing dots with a printing process of the invention.

Therefore, in the data conversion processing according to the invention, binarization processing (data conversion) is performed, as shown in FIG. 9, so that the sizes of dots formed by not only the nozzles associated with the splash bending phenomenon, that is, by not only the abnormal nozzle N6 but also the nozzles (in the shown example, the nozzles N5 and N7) near (adjacent to) the nozzle N6 are changed, compared with the original dot size, or their dots are partially omitted (thinned). Hereby, as shown in FIG. 9, large dots are formed in the "white streak" portions, whereby the "white streak" is removed or is made nearly inconspicuous. Further, by matching the area tone of the corrected portion with the area tones of other normal portions, it is possible to surely prevent the corrected portions from being conspicuous.

A concrete example of data conversion processing by the data conversion unit 30 will be described below with main reference to FIG. 6. The following is simply an example of data conversion processing according to the invention, and the printing apparatus and the printing method of the invention are not limited to this example.

In a first step S201 and step S203 shown in FIG. 6, attention is directed to one pixel constituting image data, binarization processing of whether a dot is shot on its attention getting pixel or not is executed, and regarding an error of the pixel produced by its binarization. processing, error diffusion processing is executed based on the predetermined error diffusion matrix similarly to the case of the usual data conversion.

In the error diffusion processing, when multi-valued data is binarized with a threshold on a boundary, the difference from its threshold is not left but diffused as the error to plural pixels which will be processed thereby to be used. This processing has been known. For example, in case that an attention getting pixel that is a target of processing can be expressed by 8-bit data (256 tones) and its tone is "101", this tone does not satisfy "127" that is a threshold (intermediate value) in the usual binarization processing. Therefore, this pixel is processed as a "0" pixel, that is, a pixel in which a dot is not formed, and "101" is left as it is. On the contrary, in case of the error diffusion processing, as shown in FIG. 11, its "101" is diffused to the surrounding unprocessed pixels in accordance with the predetermined error diffusion matrix. Conventionally, for example, a pixel located at a neighbor to the right of the attention getting pixel, since it does not satisfy the threshold by only the usual binarization processing similarly to the attention getting pixel, has been processed as "the pixel in which a dot is not formed", However, by receiving the error of the attention getting pixel, the pixel value of the pixel located at a neighbor to the right of the attention getting pixel exceeds the threshold, and this pixel receives processing of "forming a dot". Hereby, binary data closer to the original image data can be obtained.

Next, in case that the error diffusion processing for the attention getting pixel has been thus completed, the operation proceeds to step S205. In step S205, whether a dot is formed at the position of the attention getting pixel as a result of the binarization processing is judged. This is because printing binary data is data relating to whether a dot of the predetermined color is shot for each pixel or not and relating to the size of its dot, and the dot is not always formed for all the pixels. Therefore, when it is judged that a dot is not formed on the attention getting pixel in step S205 (in case of No), the processing directly jumps up to step S223, and the processing on the attention getting pixel ends.

In step S205, when it is judged that a dot is formed in the position of the attention getting pixel (in case of Yes), the operation proceeds to step S207. In step S207, whether the position in which the dot is formed shifts from a target position or not (whether the splash bending occurs or not) is judged. When it is judged that the dot position shifts (in case of Yes), the operation proceeds to step S209. In step S209, a lot of whether its dot size is made larger than the usual size (its dot size is made a large dot) is drawn randomly under a constant probability value, using a predetermined random number.

Next, the operation proceeds to judgment step S211. Herein, from a result of the lot in step S209, whether the lot for size enlargement processing falls on its dot or not is judged. When it is judged that its dot wins the lot of the size enlargement processing (in case of Yes), the operation proceeds further to judgment step S213. In step S213, whether the "large dot" which has already been subjected to the processing exists near the attention getting dot is judged.

In this result, when it is judged that the "large dot" exists in this region (in case of Yes), the processing jumps up to step S223 when it is judged that the "large dot" does not exist in this region (in case of No), the operation proceeds to step S217. In step S217, the enlargement change of the attention getting dot is executed, and the operation proceeds to step S219. In step S219, after reduction processing or removing processing was executed for the processed dot near the attention getting dot, the operation proceeds to step S221. In step S221, an error of dot size of each dot produced with the enlargement change and the reduction processing or the removing processing is diffused to an unprocessed pixel.

FIG. 12 shows the flow of processing from step S205 to step S221 in FIG. 6.

Namely, first, as shown in FIG. 12A, in case that the dot size of an attention getting pixel causing the splash bending phenomenon is "small", a lot for dot enlargement is drawn in order to prevent banding near the attention getting pixel. In case that the lot elect and a "large" dot does not exist near the attention getting pixel, as shown in FIG. 12B, the dot size of this attention getting pixel is changed to a "large" size. Hereby, since the large dot is formed at the white streak portion caused by the splash bending phenomenon, the white streak portion can be removed or made nearly inconspicuous.

As shown in FIG. 12C, attention is further directed to a part of dots near the attention getting dot, that is, a binarized dot located right above in the illustrated example. Since this dot is a "middle" dot, its dot size is reduced and its dot is changed to a "small" dot.

Hereby, the area tone of the attention getting pixel that has been changed before becomes nearly the same as the original area tone or the area tone of another normal portion. Therefore, the disadvantage that the density at the corrected portion becomes so high that the corrected portion is more conspicuous than other portions can also be effectively avoided.

On the other hand, FIG. 13 shows an example of processing in which the dot size of the attention getting pixel is made small though the dot size of the attention getting pixel is made large in FIG. 12. Namely, FIG. 13 shows an example of processing in case that a dark streak is first produced by the splash bending, which is different from the case shown in FIG. 9.

First, as shown in FIG. 13A, in case that the dot size of an attention getting pixel causing the splash bending phenomenon is "large", a lot for dot reduction is drawn in order to prevent a banding phenomenon due to increased density at that portion. In case that the lot is elected, sizes of dots near the attention getting pixel are further investigated. As this result, in case that a "small" dot does not exist near the attention getting pixel, as shown in FIG. 13B, the dot size of this attention getting pixel is changed to "small" size. Hereby, since a "middle" or "small" dot which is smaller than the large dot is formed at the dark streak portion caused by the splash bending phenomenon, the dark streak portion can be removed or made nearly inconspicuous.

Hereby, similarly to the afore-mentioned example, the area tone of the attention getting pixel that has been previously changed becomes nearly the same as the original area tone or , the area tone of another normal portion. Therefore, the disadvantage that the density of the corrected portion becomes low so that the corrected portion is more conspicuous than other portions can also be avoided effectively. Further, reducing the dot size processing and even eliminating the dot processing can be done.

Here, in a printing, technology itself of such a dot size shoot-division has been known. Particularly, when a printing which realizes printing speed and print image quality in high balance is obtained, this technology is typically used. Namely, though high image quality is obtained by reducing the dot size, high performance is necessary for mechanical accuracy in this case. Further, in order to form a solid image by small dots, it is necessary to shoot many dots. Therefore, by utilizing the technology of dot size shoot-division that a high minute image portion is formed by small dots and a solid image portion is formed by large dots, the printing speed and the image quality are realized in high balance.

Such a dot-size shoot-division can be readily realized technically by, in case that a piezo element (piezo actuator) is used in the printing head, changing the voltage applied to the piezo element thereby to control the ink ejection amount.

Figures 10, 11A, 11B:
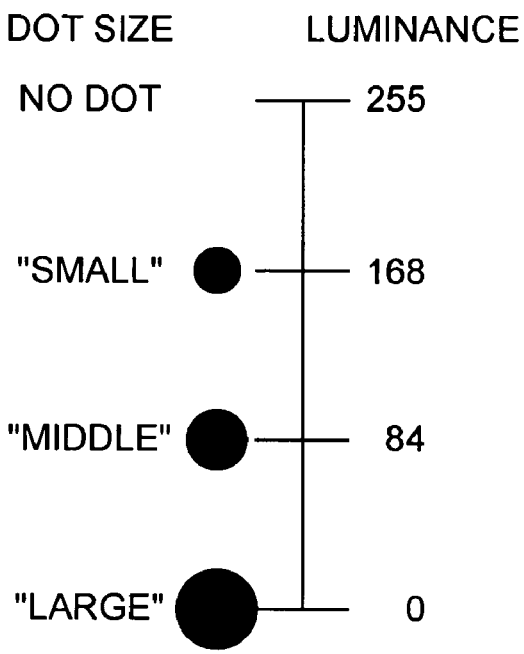
FIG. 10 is a diagram showing a relation between a dot size and luminance.
FIGS. 11A and B are diagrams showing an example of an error diffusion matrix and an error diffusion result by this matrix.

Further, as the dot sizes usually shoot-divided, as shown in FIG. 10, three kinds of "large", "middle", and "small" are used. In this embodiment, regarding the area ratio in their sizes, when a dot of the "small" size is expressed by "1", a dot of the "middle" size is expressed by "2 (twice)", and a dot of the "large" size is expressed by "3 (thrice)". Further, regarding the relation between each dot size and luminance, as shown in the drawing, in case that the "large" dot is expressed by "0" and no dot is expressed by "255", the "small" dot is expressed by "168", and the "middle" dot is expressed by "84".

Next, as shown in FIG. 6, in case that the error diffusion processing has been completed in step S221, the operation proceeds to step S223. In step S223, after the dot size of the attention getting pixel is determined, the operation proceeds to step S225. In step S225, whether the processings from step S201 to step S223 have been performed on all the pixels is judged. In case that it is judged that the processings have not been completed yet (in case of No), similar processings are repeatedly executed through step S227 on the next pixel. However, in case that it is judged that the processings have been completed on all the pixels (in case of Yes), the processings end.

Here, since the error diffusion processing shown in step S221 generally consumes much information processing capacity of the CPU, even if this processing is omitted as the case may be, the before-mentioned banding preventing effect can be obtained. However, in order to obtain better area tone at the corrected portion, it is desirable that this processing is executed as often as possible.

Further, in case that the error diffusion processing shown in step S221 is executed, the error diffusion processing in step S203 may be omitted and both processings may be executed together in step S221.

For example, an error produced with the change of the dot includes: (1) error produced by binarization processing (for example, in FIG. 10, 185–168 (luminance value of small dot)=17); (2) error produced by conversion of an attention getting dot (for example, in FIG. 10, 168–0 ((luminance value of large dot)=168); and (3) error produced by changing the binarized dot (for example, in FIG. 10, 84 (luminance value of middle dot)−168=−84). The error by scan of the total of these (1), (2) and (3) comes to "17+168−84=101" in case of the above example.

In case that the thus produced error "101" is diffused to pixels on the downstream side (unprocessed pixels) in accordance with an error diffusion matrix shown in FIG. 11A, of the error 101, the error "44" is added to the pixel located at a neighbor to the right of the attention getting pixel, the error "19", is added to the lower left pixel of the attention getting pixel, the error "32" is added to the pixel located right under the attention getting pixel, and the error "6" is added to the lower right pixel of the attention getting pixel. Each of these pixels is subjected to a similar dot change processing to the before-mentioned processing according to the value of the diffused error.

In case that the errors produced by both the binarization and the dot change are processed together, compared with the case in which the respective errors are independently executed, the error diffusion processing can be efficiently realized. Further, by thus performing both error diffusions together, convergence of the produced errors can be left to an error diffusion algorithm, so that the processing can be simplified.

Therefore, even in the printing head (printing apparatus) in which the splash bending phenomenon occurs, a high quality printing in which a white streak is nearly invisible can be obtained.

In the invention, as shown in FIG. 9, by intentionally changing the size of the dot associated with the banding phenomenon to the size that is not optimum, the white streak or the dark streak is cut. Therefore, compared with an ideal state of the optimum dot size, a slightly rough feeling may be produced. However, the phenomenon visually recognized as the white streak can be surely avoided.

Further, in the embodiment, as the dot sizes, the case in which the three sizes of "large", "middle", and "small" are used has been described. However, the number of the kinds of dot sizes may be larger, or only two kinds of "large" and "small". may be used as shown in FIG. 9. In case of FIG. 9, the original binary data is corrected as follows: of dots formed by the nozzle N6 which is causing the splash bending, the second dot 6-2 and the eighth dot 6-8 from the top are changed to "large" dots, and upper and lower "small" dots of each of their changed dots are culled out. In addition, of dots formed by the normal nozzle N5 which is associated with the white streak by the splash bending and located at a neighbor to the left of the nozzle N6, the forth dot 5-4, the sixth dot 5-6, and the tenth dot 5-10 from the top are changed to "large" dots, and the upper and lower "small" dots of each of their changed dots are culled out. Hereby, nearly the same area tone as the area tone of the other portion can be exhibited.

Further, the invention is characterized in that little changes are added to the existing printing unit 40 but image data is converted into printing data according to the printing head characteristic. Therefore, it is not necessary to prepare a special printing unit as the printing unit 40, but a conventional ink jet type printer can be utilized as it is. Further, in case that the printing unit 40 is separated from the printing apparatus 100 of the invention, the function of the printing apparatus 100 can also be realized by only a widely-used print instruction terminal (printing data generating unit) such as a PC.

Further, the invention can be applied to not only the splash bending phenomenon but also a case in which since a formation position of a nozzle shifts from a normal position though the ink ejecting direction is perpendicular (normal), dots are formed similarly to the case in the splash bending phenomenon. Further, the invention can be similarly applied to the disadvantage that ink is not ejected from a specified nozzle because of ink clogging.

Further, the printing apparatus 100 of the invention can be applied to not only the line head type ink jet printer but also the multipass type ink jet printer. In case of the line head type ink jet printer, even if the splash bending phenomenon occurs, a high quality printing in which the white streak or the dark streak is nearly inconspicuous can be obtained by one scan (one pass). Further, in case of the multipass type ink jet printer, since the number of reciprocating operations can be reduced, printing can be performed at a higher speed than printing in the conventional multipass type ink jet printer.

FIG. 14 shows respective printing types by the line head type ink jet printer and the multipass type ink jet printer.

Figure 14A:
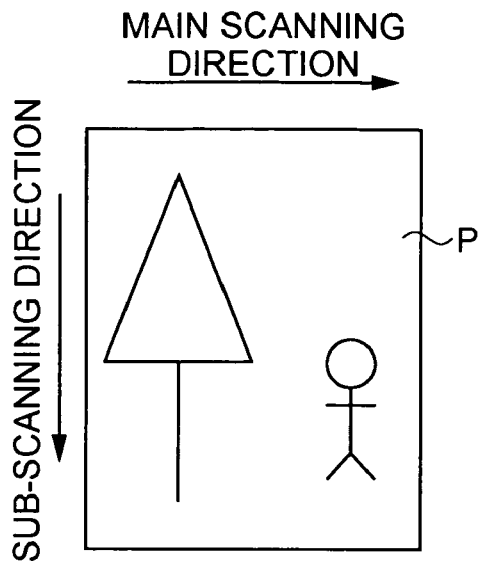
FIGS. 14A-C are explanatory views showing the difference in printing between a multipass type ink jet printer and a line head type ink jet printer.
Figure 14B:
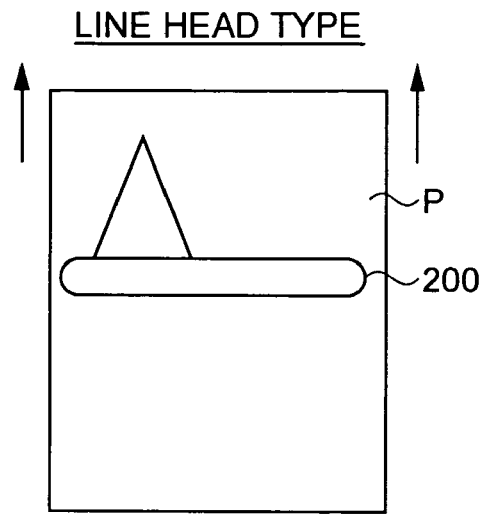
Figure 14C:
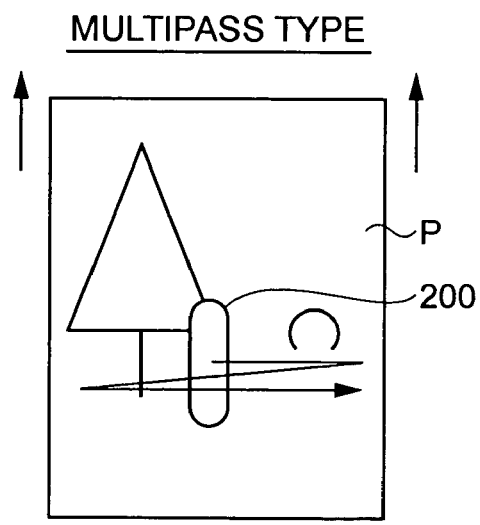

As shown in FIG. 14A, a width direction of rectangular printing paper P is taken as a main scanning direction of image data, and a longitudinal direction thereof is taken as a sub-scanning direction of image data. In the line head type ink jet printer, as shown in FIG. 14B, a printing head 200 has a length of the paper width of the printing paper P. Herein, this printing head 200 is fixed, and by moving the printing paper P in the sub-scanning direction in relation to this printing head 200, that is, by one-scan (one pass), printing is completed. Further, like a so-called flat bed type scanner, the printing paper P is fixed and the printing head 200 may be moved in the sub-scanning direction, or both the paper P and the head 200 may be moved in opposite directions to each other, thereby performing printing. On the contrary, in the multipass type ink jet printer, as shown in FIG. 14C, a printing head 200 that is much shorter than the paper width is located in the direction orthogonal to the main scanning direction, and while this printing head 200 is reciprocated many times in the main scanning direction, the printing paper P is moved in the sub-scanning direction predetermined pitch by predetermined pitch, whereby printing is executed. Therefore, in case of the latter multipass type ink jet printer, there is a defect that it takes more printing time than the case of the former line head type ink jet printer. On the other hand, in the case of the latter printer, since the printing head 200 can be located repeatedly in arbitrary portions, this printer can handle the banding phenomenon and particularly the white streak phenomenon to some degree.

Further, in the embodiment, as an example, the ink jet printer which ejects ink in the shape of a dot thereby to perform printing has been described. However, the invention can also be applied to other printing apparatuses using a printing head in which a printing mechanism is arranged in the, shape of a line, such as a thermal head printer referred to as a thermal transfer printer or a thermal printer.

Figure 15:
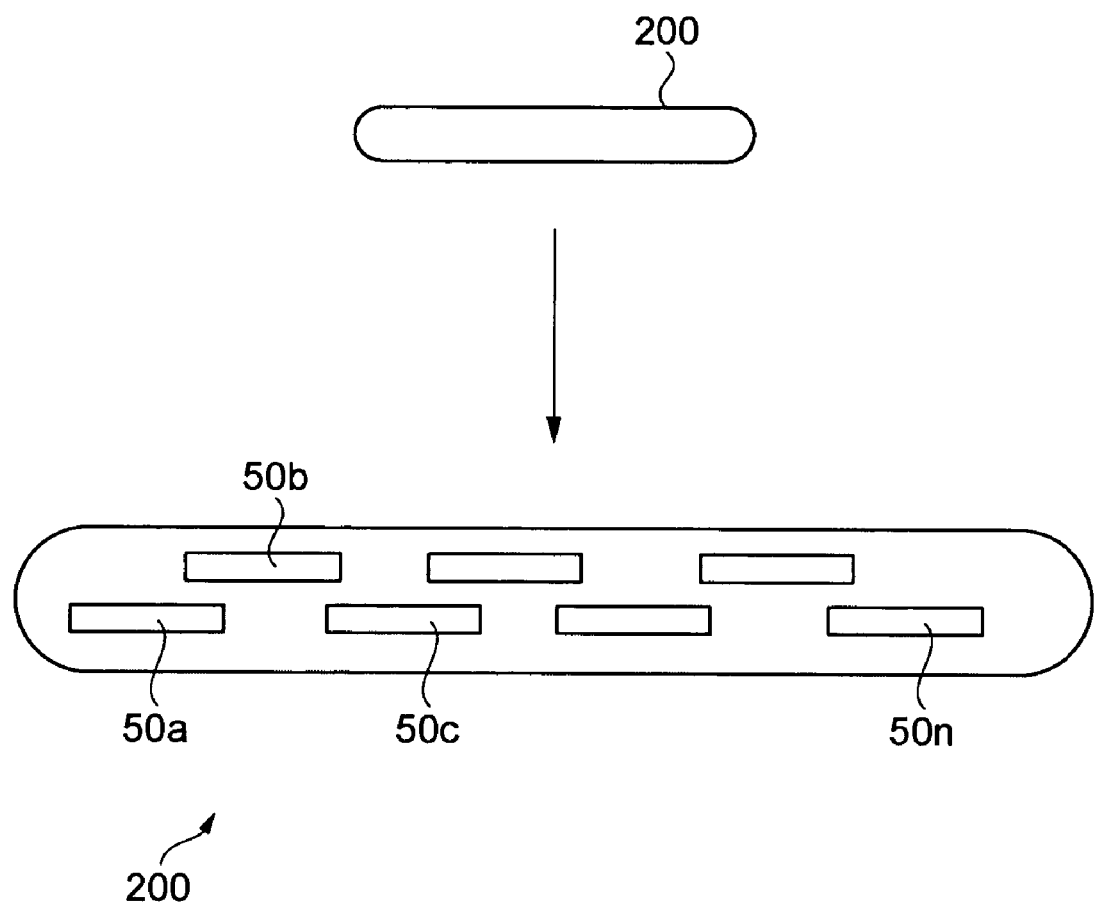
FIG. 15 is a conceptual illustration showing another example of the structure of the printing head.

In FIG. 3, in each nozzle module 50, 52, 54, 56 of the printing head 200 provided for each color, the nozzles N are linearly arranged continuously in the longitudinal direction of the printing head 200. However, as shown in FIG. 15, each of these nozzle modules 50, 52, 54, and 56 may comprise plural short nozzle units 50a, 50b, . . . and 50n, which are arranged in front and in rear in the moving direction of the printing head 200. Particularly, in case that each of the nozzle modules 50, 52, 54, and 56 comprises the plural short nozzle units 50a, 50b, . . . and 50n, without narrowing the distance (pitch) between the actual dots in each nozzle unit 50a, 50b, . . . 50n, it is possible to practically shorten the distance between the dots. Therefore, this constitution can readily provide a high resolution image.

What is claimed is:

1. A printing apparatus which prints plural dots on a printing medium by a printing head to form a predetermined image, comprising:
   an image data acquirement unit which acquires image data corresponding to the predetermined image;
   a data conversion unit which converts the image data acquired by the image data acquirement unit, for each pixel of the image data, into printing data relating to at least either of a presence and an absence of a dot;
   a printing head grasp unit which grasps characteristic information of the printing head; and
   a printing unit which executes printing based on the data obtained by the data conversion unit, wherein:
   when an occurrence of a banding phenomenon is forecasted based on the characteristic information of the printing head grasped by the printing head grasp unit, the data conversion unit converts the image data so that a size of a part or all dots associated with the banding phenomenon is changed to a size different from the size of a dot when the occurrence of the banding phenomenon is not forecasted;
   when the occurrence of the banding phenomenon is forecasted based on the characteristic information of the printing head grasped by the printing head grasp unit, the data conversion unit converts the image data so that the size of part or all dots associated with the banding phenomenon is larger than the size of a dot when the occurrence of the banding phenomenon is not forecasted; and
   the data conversion unit converts the image data so that large converted dots do not continue adjacently in a part of dots associated with the banding phenomenon.

2. A printing apparatus which prints plural dots on a printing medium by a printing head to form a predetermined image, comprising:
   an image data acquirement unit which acquires image data corresponding to the predetermined image;
   a data conversion unit which converts the image data acquired by the image data acquirement unit, for each pixel of the image data, into printing data relating to at least either of a presence and an absence of a dot;
   a printing head grasp unit which grasps characteristic information of the printing head; and
   a printing unit which executes printing based on the data obtained by the data conversion unit, wherein:
   when an occurrence of a banding phenomenon is forecasted based on the characteristic information of the printing head grasped by the printing head grasp unit, the data conversion unit converts the image data so that a size of a part or all dots associated with the banding phenomenon is changed to a size different from the size of a dot when the occurrence of the banding phenomenon is not forecasted;
   when the occurrence of the banding phenomenon is forecasted based on the characteristic information of the printing head grasped by the printing head grasp unit, the data conversion unit converts the image data so that the size of part or all dots associated with the banding phenomenon is larger than the size of a dot when the occurrence of the banding phenomenon is not forecasted; and
   when the size of the partial dot associated with the banding phenomenon is made large, the data conversion unit converts the image data so that a dot near the large changed dot is not printed.

3. A printing apparatus which prints plural dots on a printing medium by a printing head to form a predetermined image, comprising:
   an image data acquirement unit which acquires image data corresponding to the predetermined image;
   a data conversion unit which converts the image data acquired by the image data acquirement unit, for each pixel of the image data, into printing data relating to at least either of a presence and an absence of a dot;
   a printing head grasp unit which grasps characteristic information of the printing head; and
   a printing unit which executes printing based on the data obtained by the data conversion unit, wherein:
   when an occurrence of a banding phenomenon is forecasted based on the characteristic information of the printing head grasped by the printing head grasp unit, the data conversion unit converts the image data so that a size of a part or all dots associated with the banding phenomenon is changed to a size different from the size of a dot when the occurrence of the banding phenomenon is not forecasted; and
   when the occurrence of the banding phenomenon is forecasted based on the characteristic information of the printing head grasped by the printing head grasp unit, the data conversion unit converts the image data so that the size of part or all dots associated with the banding phenomenon is smaller than a size of a dot when the occurrence of the banding phenomenon is not forecasted.

4. A printing apparatus which prints plural dots on a printing medium by a printing head to form a predetermined image, comprising:
   an image data acquirement unit which acquires image data corresponding to the predetermined image;
   a data conversion unit which converts the image data acquired by the image data acquirement unit, for each pixel of the image data, into printing data relating to at least either of a presence and an absence of a dot;
   a printing head grasp unit which grasps characteristic information of the printing head; and
   a printing unit which executes printing based on the data obtained by the data conversion unit, wherein:
   when an occurrence of a banding phenomenon is forecasted based on the characteristic information of the printing head grasped by the printing head grasp unit, the data conversion unit converts the image data so that a size of a part or all dots associated with the banding phenomenon is changed to a size different from the size of a dot when the occurrence of the banding phenomenon is not forecasted;
   when the occurrence of the banding phenomenon is forecasted based on the characteristic information of the printing head grasped by the printing head grasp unit, the data conversion unit converts the image data so that the size of part or all dots associated with the banding phenomenon is smaller than a size of a dot when the occurrence of the banding phenomenon is not forecasted; and
   the data conversion unit converts the image data so that small converted dots do not continue adjacently in a part of dots associated with the banding phenomenon.

5. A printing apparatus which prints plural dots on a printing medium by a printing head to form a predetermined image, comprising:
   an image data acquirement unit which acquires image data corresponding to the predetermined image;
   a data conversion unit which converts the image data acquired by the image data acquirement unit, for each pixel of the image data, into printing data relating to at least either of a presence and an absence of a dot;

a printing head grasp unit which grasps characteristic information of the printing head; and a printing unit which executes printing based on the data obtained by the data conversion unit, wherein:

when an occurrence of a banding phenomenon is forecasted based on the characteristic information of the printing head grasped by the printing head grasp unit, the data conversion unit converts the image data so that a size of a part or all dots associated with the banding phenomenon is changed to a size different from the size of a dot when the occurrence of the banding phenomenon is not forecasted; and when the size of the dot associated with the banding phenomenon changes, the data conversion unit diffuses an error between the dot size when the size is not changed and the dot size after the change into an unprocessed dot, and converts the size of the dot based on the value after diffusion.

6. A printing apparatus which prints plural dots on a printing medium by a printing head to form a predetermined image, comprising:

an image data acquirement unit which acquires image data corresponding to the predetermined image;

a data conversion unit which converts the image data acquired by the image data acquirement unit, for each pixel of the image data, into printing data relating to at least either of a presence and an absence of a dot;

a printing head grasp unit which grasps characteristic information of the printing head; and a printing unit which executes printing based on the data obtained by the data conversion unit, wherein:

when an occurrence of a banding phenomenon is forecasted based on the characteristic information of the printing head grasped by the printing head grasp unit, the data conversion unit converts the image data so that a size of a part or all dots associated with the banding phenomenon is changed to a size different from the size of a dot when the occurrence of the banding phenomenon is not forecasted; and the printing head has a printing mechanism of the dot arranged in a width direction of the printing medium, and executes printing by one scan.

7. A printing apparatus which prints plural dots on a printing medium by a printing head to form a predetermined image, comprising:

an image data acquirement unit which acquires image data corresponding to the predetermined image;

a data conversion unit which converts the image data acquired by the image data acquirement unit, for each pixel of the image data, into printing data relating to at least either of a presence and an absence of a dot;

a printing head grasp unit which grasps characteristic information of the printing head; and a printing unit which executes printing based on the data obtained by the data conversion unit, wherein:

when an occurrence of a banding phenomenon is forecasted based on the characteristic information of the printing head grasped by the printing head grasp unit, the data conversion unit converts the image data so that a size of a part or all dots associated with the banding phenomenon is changed to a size different from the size of a dot when the occurrence of the banding phenomenon is not forecasted; and wherein the printing head executes printing while reciprocating in a width direction of the recording medium.

* * * * *